(12) United States Patent
Siomina

(10) Patent No.: US 11,564,198 B2
(45) Date of Patent: Jan. 24, 2023

(54) CONTROLLING REFERENCE TRANSMISSION POINT SELECTION FOR RSTD MEASUREMENTS

(71) Applicant: TELEFONAKTIEBOLAGET LM ERICSSON (PUBL), Stockholm (SE)

(72) Inventor: Iana Siomina, Täby (SE)

(73) Assignee: Telefonaktiebolaget LM Ericsson (publ), Stockholm (SE)

(\*) Notice: Subject to any disclaimer, the term of this patent is extended or adjusted under 35 U.S.C. 154(b) by 604 days.

(21) Appl. No.: 16/325,105

(22) PCT Filed: Aug. 14, 2017

(86) PCT No.: PCT/IB2017/054950
§ 371 (c)(1),
(2) Date: Feb. 12, 2019

(87) PCT Pub. No.: WO2018/029663
PCT Pub. Date: Feb. 15, 2018

(65) Prior Publication Data
US 2021/0289466 A1  Sep. 16, 2021

Related U.S. Application Data

(60) Provisional application No. 62/374,427, filed on Aug. 12, 2016.

(51) Int. Cl.
*H04W 64/00* (2009.01)
*H04L 5/00* (2006.01)
(Continued)

(52) U.S. Cl.
CPC ......... *H04W 64/006* (2013.01); *H04L 5/0048* (2013.01); *H04W 24/10* (2013.01); *H04W 48/20* (2013.01)

(58) Field of Classification Search
CPC .............. H04W 64/006; H04W 48/20; H04W 24/10; H04W 64/00; H04L 5/0048; G01S 5/10; G01S 5/0221; G01S 5/0236
(Continued)

(56) References Cited

U.S. PATENT DOCUMENTS

2012/0275329 A1  11/2012  Chin et al.
2012/0314604 A1  12/2012  Siomina et al.
(Continued)

FOREIGN PATENT DOCUMENTS

CN     103168249 A    6/2013
JP     2016-001188 A  1/2016
(Continued)

OTHER PUBLICATIONS

Ericsson, On solutions for OTDOA with RRH, R4-147482, 3GPP TSG-RAN WG4 Meeting #73, San Francisco, US, Nov. 17-21, 2014.
(Continued)

*Primary Examiner* — Michael Y Mapa
(74) *Attorney, Agent, or Firm* — Sage Patent Group

(57) ABSTRACT

According to certain embodiments, a wireless device includes an interface and processing circuitry operably coupled to the interface. The interface is configured to receive assistance information from a first node. The assistance information includes data associated with a first reference TP. The first reference TP may be located in a cell having two or more TPs. The processing circuitry is configured to calculate a first reference signal time difference (RSTD) measurement using the data associated with a first reference TP.

50 Claims, 10 Drawing Sheets

(51) Int. Cl.
*H04W 24/10* (2009.01)
*H04W 48/20* (2009.01)

(58) Field of Classification Search
USPC .............................. 370/329; 455/456.1–457
See application file for complete search history.

(56) References Cited

U.S. PATENT DOCUMENTS

| | | |
|---|---|---|
| 2014/0235273 A1 | 8/2014 | Ahn et al. |
| 2014/0295883 A1 | 10/2014 | Kang et al. |
| 2017/0276761 A1* | 9/2017 | Park .......................... G01S 5/02 |
| 2018/0024225 A1* | 1/2018 | Chae ......................... G01S 5/02 342/118 |

FOREIGN PATENT DOCUMENTS

| | | |
|---|---|---|
| WO | 20110626600 A | 5/2011 |
| WO | 2015178830 A1 | 11/2015 |

OTHER PUBLICATIONS

First Chinese Office Action for Chinese Patent Application No. CN 201780063471.9 dated Sep. 1, 2022, 12 pages (including English translation).

* cited by examiner

CONTROLLING REFERENCE TRANSMISSION POINT SELECTION FOR RSTD MEASUREMENTS

This application is a 371 of International Application No. PCT/162017/054950, filed Aug. 14, 2017, which claims priority to U.S. Application No. 62/374,427, filed Aug. 12, 2016, the disclosures of which are fully incorporated herein by reference.

TECHNICAL FIELD

The present disclosure relates, in general, to location determination and, more specifically, to controlling reference transmission point selection for reference signal time difference measurements.

BACKGROUND

Several positioning methods exist for determining the location of a target device, (e.g., a wireless device or UE, mobile relay, PDA, wireless device for machine type communication (aka machine to machine communication), laptop mounting wireless devices or equipment, among others). The position of the target device is determined by using one or more positioning measurements, which can be performed by a suitable measuring node or by the target device. Depending upon the positioning method used, the measuring node can be a number of devices, including but not limited to the target device itself, a separate radio node (e.g., a standalone node), and serving and/or neighboring nodes of the target device. Depending upon the positioning method the measurements can also be performed by one or more types of measuring nodes.

FIG. 1 illustrates an example positioning architecture in an LTE network, in accordance with certain embodiments. The LTE architecture of FIG. 1 supports location services by defining the Evolved Serving Mobile Location Center (E-SMLC) that is connected to the core network (e.g., Mobility Management Entity (MME)) via the so called LCS-AP interface and the Gateway Mobile Location Center (GMLC) that is connected to the MME via the standardized Lg interface. The LTE system supports a range of methods to locate the position of the target devices (e.g. UEs) within the coverage area of the radio access network (RAN). These methods differ in accuracy and availability. Typically, satellite based methods (e.g., GPS, Assisted GNSS) are accurate with a (few) meter(s) of resolution, but may not be available in indoor environments. On the other hand, Cell-ID based methods are much less accurate, but have high availability. Therefore, in some embodiments, LTE uses A-GPS as the primary method for positioning, while Cell-ID and observed time difference of arrival (OTDOA) based schemes serve as fall-back methods.

In LTE, the positioning node (aka E-SMLC or location server) configures the target device (e.g. UE), eNode B or a radio node dedicated for positioning measurements (e.g. LMU) to perform one or more positioning measurements depending upon the positioning method. The positioning measurements are used by the target device or by a measuring node or by the positioning node to determine the location of the target device. In LTE, the positioning node communicates with UE using LTE positioning protocol (LPP) and with eNode B using LTE positioning protocol annex (LPPa).

Referring to FIG. 1, three key network elements in an LTE positioning architecture are the LCS Client, the LCS target and the LCS Server. The LCS Server is a physical or logical entity managing positioning for a LCS target device by collecting measurements and other location information, assisting the terminal in measurements when necessary, and estimating the LCS target location. A LCS Client is a software and/or hardware entity that interacts with a LCS Server for the purpose of obtaining location information for one or more LCS targets, i.e. the entities being positioned. LCS Clients may also reside in the LCS targets themselves. An LCS Client sends a request to LCS Server to obtain location information, and LCS Server processes and serves the received requests and sends the positioning result and optionally a velocity estimate to the LCS Client. A positioning request can be originated from the terminal or a network node or external client.

Position calculation can be conducted, for example, by a positioning server (e.g. E-SMLC or SLP in LTE) or UE. The former approach corresponds to the UE-assisted positioning mode when it is based on UE measurements, whilst the latter corresponds to the UE-based positioning mode.

Observed Time Difference of Arrival (OTDOA) Positioning

In LTE the OTDOA method uses UE measurements related to time difference of arrival of signals from radio nodes for determining UE position. To speed up OTDOA measurements, and also to improve their accuracy, the positioning server provides OTDOA assistance information to the target device. The OTDOA can also be UE based or UE assisted positioning method. In the former, the target device determines its location itself whereas in the latter the positioning server (e.g. E-SMLC) uses the received OTDOA measurements from the target device to determine the location of the target device.

The LTE OTDOA UE measurement is performed on positioning reference signal (PRS). Each RSTD measurement is performed either on CRS or on PRS transmitted by a reference cell and PRS transmitted from a neighboring cell. To achieve sufficient positioning accuracy the RSTD measurements from multiple distinct pair of sites (reference and neighbor cells) are required.

In some embodiments, the PRS are transmitted from one antenna port (R6) according to a pre-defined pattern. FIG. 2 illustrates an example PRS pattern, in accordance with certain embodiments. In FIG. 2, the marked squares indicate PRS resource elements within a block of 12 subcarriers over 14 OFDM symbols (1 ms subframe with normal cyclic prefix). A set of frequency shifts can be applied to the pre-defined PRS patterns to obtain a set of orthogonal patterns which can be used in neighbour cells to reduce interference on PRS and thus improve positioning measurements. The effective frequency reuse of six can be modelled in this way. The frequency shift is defined as a function of Physical Cell ID (PCI) as follows:

$$v_{shift} = \mod(PCI, 6)$$

PRS can also be transmitted with zero power or muted or with reduced power. PRS are transmitted in pre-defined positioning subframes grouped by several consecutive subframes ($N_{PRS}$), i.e. one positioning occasion, which occur periodically with a certain periodicity of N subframes, i.e. the time interval between two positioning occasions. The periods N are 160, 320, 640, and 1280 ms, and the number of consecutive subframes $N_{PRS}$ can be 1, 2, 4, or 6.

To improve hearability of PRS, i.e. to allow for detecting PRS from multiple sites and at a reasonable quality, positioning subframes have been designed as low-interference subframes, i.e. it has also been agreed that no data transmissions are allowed in general in positioning subframes.

This results in that in synchronous networks PRS are ideally interfered only by PRS from other cells having the same PRS pattern index (i.e. same vertical shift v_shift) and not by data transmissions.

Reference Signal Time Difference (RSTD) Measurements

RSTD measurement definition is currently specified in 3GPP TS 36.214 with respect to cells, as follows:

| | |
|---|---|
| Definition | The relative timing difference between the neighbor cell j and the reference cell i, defined as $T_{SubframeRxj} - T_{SubframeRxi}$, where: $T_{SubframeRxj}$ is the time when the UE receives the start of one subframe from cell j $T_{SubframeRxi}$ is the time when the UE receives the corresponding start of one subframe from cell i that is closest in time to the subframe received from cell j. The reference point for the observed subframe time difference shall be the antenna connector of the UE. |
| Applicable for | RRC_CONNECTED intra-frequency RRC_CONNECTED inter-frequency |

As can be seen above, an RSTD measurement consists of two elements: a measured cell timing and a reference cell timing. The reference cell (selected by the network) is indicated to the UE in the OTDOA assistance data via LPP (TS 36.355):

```
OTDOA-ProvideAssistanceData ::= SEQUENCE {
otdoa-ReferenceCellInfo      OTDOA-ReferenceCellInfo OPTIONAL--Need ON
otdoa-NeighbourCellInfo   OTDOA-NeighbourCellInfoList OPTIONAL--Need ON
otdoa-Error                  OTDOA-Error             OPTIONAL-- Need ON
   ...
}
OTDOA-ReferenceCellInfo ::= SEQUENCE {
   physCellId           INTEGER (0..503),
   cellGlobalId         ECGI                    OPTIONAL -- Need ON
   earfcnRef            ARFCN-ValueEUTRA OPTIONAL -- Cond
NotSameAsServ0
   antennaPortConfig    ENUMERATED {ports1-or-2, ports4, ... }
                                                OPTIONAL,   -- Cond
NotSameAsServ1
   cpLength             ENUMERATED { normal, extended, ... },
   prsInfo              PRS-Info                OPTIONAL,   -- Cond PRS
   ...,
   [[ earfcnRef-v9a0    ARFCN-ValueEUTRA-v9a0   OPTIONAL -- Cond
NotSameAsServ2
   ]]
}
```

It is also possible that a UE reselects a reference cell and reports the UE-selected reference cell together with RSTD measurement results (via LPP, TS 36.355), as follows:

```
OTDOA-SignalMeasurementInformation ::= SEQUENCE {
   systemFrameNumber    BIT STRING (SIZE (10)),
   physCellIdRef        INTEGER (0..503),
   cellGlobalIdRef      ECGI                    OPTIONAL,
   earfcnRef            ARFCN-ValueEUTRA        OPTIONAL,   -- Cond
NotSameAsRef0
   referenceQuality     OTDOA-MeasQuality       OPTIONAL,
   neighbourMeasurementList NeighbourMeasurementList,
   ...,
   [[ earfcnRef-v9a0    ARFCN-ValueEUTRA-v9a0 OPTIONAL -- Cond
NotSameAsRef1
   ]]
}
```

| OTDOA-SignalMeasurementInformation field descriptions |
|---|
| systemFrameNumber: This field specifies the SFN of the RSTD reference cell containing the starting subframe of the PRS positioning occasion if PRS are available on the RSTD reference cell, or subframe of the CRS for RSTD measurements if PRS are not available on the RSTD reference cell during which the most recent neighbour cell RSTD measurement was performed. |
| physCellIdRef: This field specifies the physical cell identity of the RSTD reference cell. |
| cellGlobalIdRef: This field specifies the ECGI, the globally unique identity of a cell in E-UTRA, of the RSTD reference cell. The target shall provide this IE if it knows the ECGI of the RSTD reference cell. |
| earfcnRef: This field specifies the EARFCN of the RSTD reference cell. |
| referenceQuality: This field specifies the target device's best estimate of the quality of the TOA measurement from the RSTD reference cell, $T_{SubframeRxRef}$ where $T_{SubframeRxRef}$ is the time of arrival of the signal from the RSTD reference cell. |
| neighbourMeasurementList: This list contains the measured RSTD values for neighbour cells together with the RSTD reference cell, along with quality for each measurement. |
| physCellIdNeighbour: This field specifies the physical cell identity of the neighbour cell for which the RSTDs are provided. |
| cellGlobalIdNeighbour: This field specifies the ECGI, the globally unique identity of a cell in E-UTRA, of the neighbour cell for which the RSTDs are provided. The target |

| -continued |
|---|
| OTDOA-SignalMeasurementInformation field descriptions |
| device shall provide this IE if it was able to determine the ECGI of the neighbour cell at the time of measurement. |
| earfcnNeighbour: This field specifies the EARFCN of the neighbour cell used for the RSTD measurements. |
| rstd: This field specifies the relative timing difference between this neighbour cell and the RSTD reference cell, as defined in [17]. Mapping of the measured quantity is defined as in [18] subclause 9.1.10.3. |
| rstd-Quality: This field specifies the target device's best estimate of the quality of the measured rstd. |

Shared Cell

A shared cell is a type of downlink (DL) coordinated multi-point (CoMP) where multiple geographically separated transmission points (TPs) dynamically coordinate their transmission towards the UE. The unique feature of shared cell is that all transmission points within the shared cell have the same physical cell ID (PCI). This means UE cannot distinguish between the TPs by the virtue of the PCI decoding. The PCI is acquired during a measurement procedure e.g. cell identification etc.

FIG. 3 illustrates an example shared cell comprising one macro cell and several RRHs, in accordance with certain embodiments. As illustrated in FIG. 3, in typical deployment a shared cell comprises of a heterogeneous network with low power RRHs within the macrocell coverage where the transmission/reception points created by the RRHs have the same cell IDs as that of the macro cell. In general a shared cell comprises of a set of low power nodes (LPN) and a serving high power node (HPN).

The shared cell approach can be implemented by distributing the same cell specific signals on all points (within the macro point coverage area). With such a strategy, the same physical signals such as primary synchronization signals (PSS), secondary synchronization signals (SSS), cell specific reference signals (CRS), positioning reference signal (PRS), etc and the same physical channels such as physical broadcast channel (PBCH), physical downlink shared channel (PDSCH) containing paging and system information blocks (SIBs), control channels (PDCCH, PCFICH, PHICH) etc are transmitted from each TP in the DL. Tight synchronization in terms of transmission timings between the TPs within a shared is used e.g. in order of ±100 ns between any pair of nodes. This enables the physical signals and channels transmitted from M points to be combined over air. The combining is similar to what is encountered in single-frequency networks (SFN) for broadcast. Due to the SFN effect, the average received signal strength on the UE side increases leading to improved coverage of the sync and control channels.

The maximum output power of a HPN can for example typically be between 43-49 dBm. Example of HPN is macro node (aka wide area base station). Examples of low power nodes are micro node (aka medium area base station), pico node (aka local area base station), femto node (home base station, or HBS), relay node etc. The maximum output power of a low power node for example typically is between 20-38 dBm depending upon the power class. For example, a pico node typically has a maximum output power of 24 dBm whereas HBS has a maximum output power of 20 dBm.

The size of shared cell in terms of cell radius can vary from few hundred meters (e.g. 100-500 m) to few kilometers (e.g. 1-5 km).

The term shared cell is interchangeably used with other similar terms such as CoMP cluster with common cell ID, cluster cell with common cell ID, combined cell, RRH, RRU, distributed antenna system (DAS), heterogeneous network with shared cell ID, etc. Similarly the term transmission point is also interchangeably used with other similar terms such as radio nodes, radio network nodes, base station, radio units, remote antenna, etc. All of them bear the same meaning. For consistency the term shared cell which is also more generic is used herein. Furthermore, the term transmission point (TP) for individual nodes within a shared cell is also used for consistency.

Multi-Carrier or Carrier Aggregation

In a multi-carrier or carrier aggregation system, a carrier is generally termed as a component carrier (CC) or sometimes is also referred to a cell or serving cell. In principle each CC has multiple cells. The term carrier aggregation (CA) is also called (e.g. interchangeably called) "multi-carrier system", "multi-cell operation", "multi-carrier operation", "multi-carrier" transmission and/or reception. This means the CA is used for transmission of signaling and data in the uplink and downlink directions. One of the CCs is the primary component carrier (PCC) or simply primary carrier or even anchor carrier. The remaining ones are called secondary component carrier (SCC) or simply secondary carriers or even supplementary carriers. Generally, the primary or anchor CC carries the essential UE specific signaling. The primary CC (aka PCC or PCell) exists in both uplink and downlink directions in CA. In case there is single UL CC the PCell is obviously on that CC. The network may assign different primary carriers to different UEs operating in the same sector or cell.

The multi-carrier operation may also be used in conjunction with multi-antenna transmission. For example signals on each CC may be transmitted by the eNB to the UE over two or more antennas. The CCs in CA may or may not be co-located in the same site or base station or radio network node (e.g. relay, mobile relay etc). For instance the CCs may originate (i.e. transmitted/received) at different locations (e.g. from non-located BS or from BS and RRH or RRU). Examples of combined CA and multi-point communication are DAS, RRH, RRU, CoMP, multi-point transmission/reception etc. The embodiments and features disclosed herein also apply to multi-point carrier aggregation systems i.e. are applicable to each CC in CA or in CA combination with CoMP, etc.

The current 3GPP standard does not support a TP being an RSTD measurement reference, only reference cells; however, a cell, if it's a shared cell can have multiple TPs and a set of multiple TPs cannot be used as a references for RSTD measurements. Furthermore, it is not trivial to select a specific TP as a reference.

SUMMARY

To address the foregoing problems, disclosed is a method in a wireless device for reference transmission point (TP) selection. The method includes receiving assistance information from a first node, the assistance information comprising data associated with a first reference TP, the first reference TP located in a cell having two or more TPs. The method may further include calculating a first reference signal time difference (RSTD) measurement using the data associated with a first reference TP. In some embodiments, the method may include communicating the first RSTD measurement to a second node. In some embodiments, the first node and the second node may be the same node.

In certain embodiments, the method may include utilizing the first RSTD measurement in an operational task of the wireless device. An operational task of the UE may include determining a position of the wireless device, controlling the wireless device transmit timing or timing advance, RRM, storing the RSTD measurement in one or more internal or external databases, and/or utilize the RSTD measurement for a self-organizing network (SON) solution, among others.

In certain embodiments the data associated with the first reference TP includes a TP specific identification. In certain embodiments, the data associated with the first reference TP comprises a TP specific muting pattern. In certain embodiments, the data associated with the first reference TP comprises a reference cell associated with the first reference TP.

In certain embodiments the method further includes communicating, to a second node, a capability of the wireless device to support RSTD measurements in a cell having two or more TPs. In some embodiments, the first node and the second node are the same node.

In certain embodiments, the method further includes determining that the first reference TP does not provide an acceptable RSTD measurement, selecting a second reference TP different from the first reference TP, and calculating a second RSTD measurement from the second reference TP. In some embodiments, the method further includes communicating the second RSTD measurement to a second node. In some embodiments, the first node and the second node are the same node and the first reference TP and the second reference TP are the same reference TP. In some embodiments, the method further includes communicating, to the second node, a reference cell associated with the second reference TP.

In certain embodiments, the method includes communicating a second reference TP, different from the first reference TP, to at least one of the first node or a second node.

In some embodiments, the first node is one selected from the group comprising: a positioning node, an eNodeB, a radio base station, and a UE.

According to certain embodiments, a method in a network node for reference transmission point (TP) selection includes determining a first reference TP for a wireless device to use to calculate a first reference signal time difference (RSTD) measurement, the first reference TP located in a cell having two or more TPs. The method further includes communicating assistance information to the wireless device, the assistance information comprising data associated with the first reference TP.

In certain embodiments, the method may further include receiving, from the wireless device, a capability of the wireless device to support RSTD measurements in a cell having two or more TPs.

In certain embodiments, the method further includes receiving, from a first node, data associated with the first reference TP. In some embodiments, the first node is one selected from the group comprising an eNodeB, a positioning node, a radio network node, and a wireless device.

In certain embodiments, the data associated with the first reference TP comprises a TP specific identification. In certain embodiments, the data associated with the first reference TP comprises a TP specific muting pattern. In certain embodiments, the data associated with the first reference TP comprises a reference cell associated with the first reference TP.

In certain embodiments, the method further includes receiving, from the wireless device, a first RSTD measurement associated with the data associated with the first reference TP.

In certain embodiments, the method further includes receiving, from the wireless device, an indication of a second reference TP. In some embodiments, the indication of a second reference TP comprises a reference cell associated with the second reference TP. In some embodiments, the first reference TP and the second reference TP are the same reference TP.

According to certain embodiments, a wireless device includes an interface and processing circuitry operably coupled to the interface. The interface is configured to receive assistance information from a first node. The assistance information includes data associated with a first reference TP. The first reference TP may be located in a cell having two or more TPs. The processing circuitry is configured to calculate a first reference signal time difference (RSTD) measurement using the data associated with a first reference TP.

In certain embodiments, the interface may communicate the first RSTD measurement to a second node. In some embodiments the first node and the second node may be the same node.

In certain embodiments, the data associated with the first reference TP comprises a reference cell associated with the first reference TP.

In certain embodiments, the processing circuitry is further configured to utilize the first RSTD measurement in an operational task of the wireless device. An operational task of the UE may include determining a position of the wireless device, controlling the wireless device transmit timing or timing advance, RRM, storing the RSTD measurement in one or more internal or external databases, and/or utilize the RSTD measurement for a self-organizing network (SON) solution, among others.

In certain embodiments, the data associated with the first reference TP comprises a TP specific identification. In some embodiments, the data associated with the first reference TP comprises a TP specific muting pattern.

In certain embodiments, the interface may communicate, to a second node, a capability of the wireless device to support RSTD measurements in a cell having two or more TPs. In some embodiments the first node and the second node may be the same node.

In certain embodiments, the processing circuitry may determine that the first reference TP does not provide an acceptable RSTD measurement. The processing circuitry may then select a second reference TP different from the first reference TP and calculate a second RSTD measurement from the second reference TP. In some embodiments, the interface is configured to communicate the second RSTD measurement to a second node. In some embodiments, the first node and the second node are the same node and the first reference TP and the second reference TP are the same reference TP.

In certain embodiments, the interface is configured to communicate a reference cell associated with the second reference TP at least to at least one of the first node or a second node.

In certain embodiments, the interface is configured to communicate a second reference TP, different from the first reference TP, to at least one of the first node or a second node.

In some embodiments, the first node is one selected from the group comprising: a positioning node, an eNodeB, a radio base station, and a UE.

According to certain embodiments, a network node includes processing circuitry and an interface operably coupled to the processing circuitry. The processing circuitry configured to determine a first reference TP for a wireless device to use to calculate a first reference signal time difference (RSTD) measurement, the first reference TP located in a cell having two or more TPs. The interface configured to communicate assistance information to the wireless device, the assistance information comprising data associated with the first reference TP.

In certain embodiments the interface is further configured to receive, from the wireless device, a capability of the wireless device to support RSTD measurements in a cell having two or more TPs. In some embodiments, the interface is further configured to receive, from a first node, data associated with the first reference TP. The first node may be one selected from the group comprising: an eNodeB, a positioning node, a radio network node, and a wireless device.

In certain embodiments, the data associated with the first reference TP comprises a TP specific identification. In certain embodiments, the data associated with the first reference TP comprises a TP specific muting pattern. In certain embodiments, the data associated with the first reference TP comprises a reference cell associated with the first reference TP.

In certain embodiments, the interface is further configured to receive, from the wireless device, a first RSTD measurement associated with the data associated with the first reference TP.

In certain embodiments, the interface is further configured to receive, from the wireless device, an indication of a second reference TP. In some embodiments, the indication of a second reference TP comprises a reference cell associated with the second reference TP. In some embodiments, the first reference TP and the second reference TP are the same reference TP.

Certain embodiments of the present disclosure may provide one or more technical advantages. For example, certain embodiments may allow for the use of a TP as an RSTD measurement reference thereby allowing for additional RSTD measurement reference sources. In certain embodiments, additional RSTD measurement reference sources may allow for more accurate RSTD measurements depending on the location of the available TP(s) and the UE. Certain embodiments may allow for the optimal selection of a TP as a reference cell, thereby improving the reception of measurements used to determine a UE location. Accordingly, certain embodiments may advantageously allow for an improved and/or more efficient location estimate of a UE.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, there are a number of technical issues associated with selecting a reference transmission point (TP) for reference signal time difference (RSTD) measurements. For example, a shared cell configuration may include multiple TPs. However, the TPs within the shared cell may have the same physical cell ID, which means that the wireless device cannot distinguish between the TPs simply by using physical cell ID decoding. Multiple TPs cannot collectively be used as references for RSTD measurements, which limits the options that available to a wireless device to select a RSTD reference.

Controlling the selection of a reference TP for RSTD measurements provides a number of technical advantages not realized by current systems. Certain embodiments may allow the use of a TP as an RSTD measurement reference thereby allowing for additional RSTD measurement reference sources, even when the TP is part of a shared cell. Additional RSTD measurement reference sources may allow for more accurate RSTD measurements based on the location of the available TP(s) and the UE. Certain embodiments may allow for the optimal selection of a TP as a reference cell, thereby improving the reception of measurements used to determine a UE location. Accordingly, certain embodiments may advantageously allow for an improved and/or more efficient location estimate of a UE. FIGS. 4-10 provide additional details for controlling reference TP selection for RSTD measurements that may provide these and other advantages.

Figure 1:
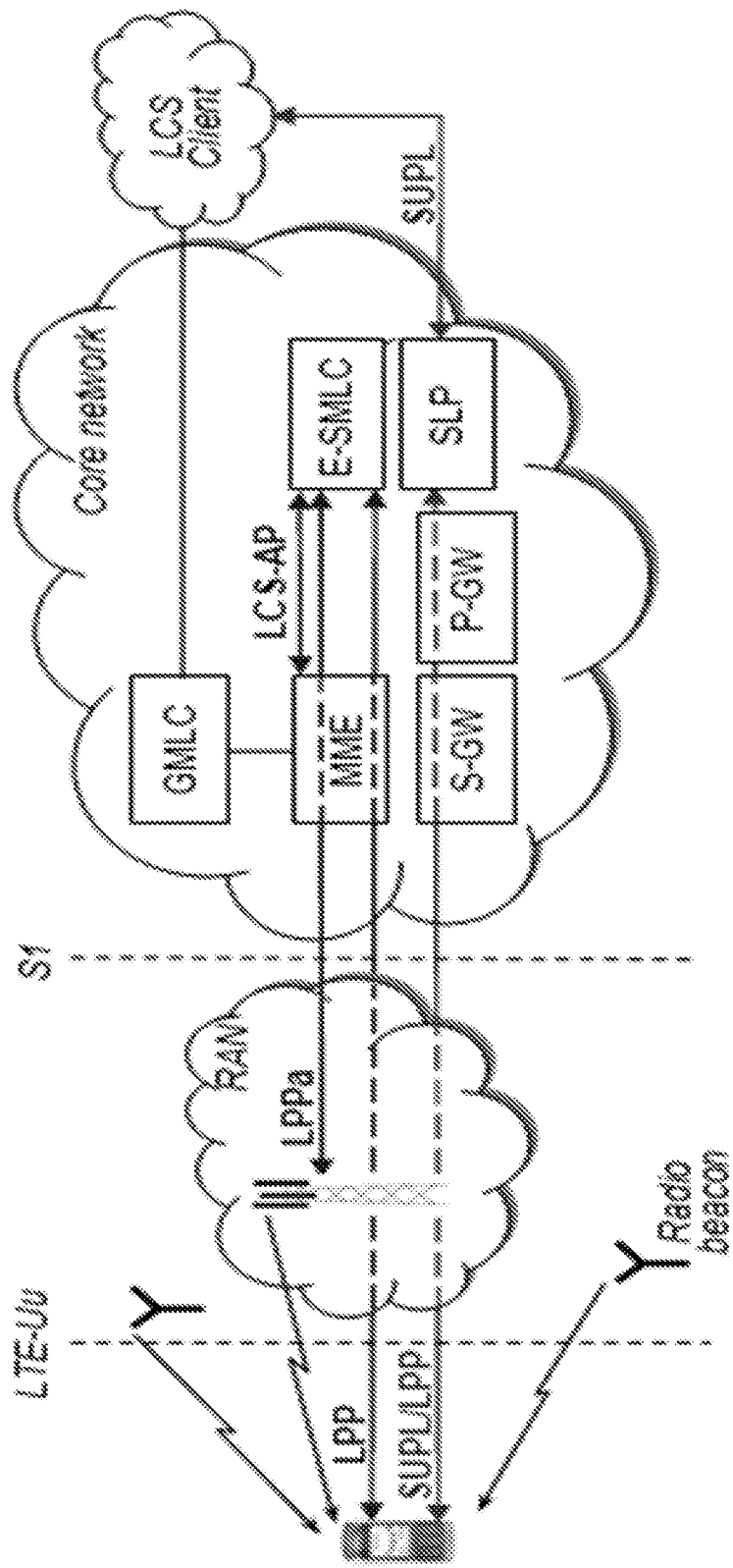
FIG. 1 illustrates an example positioning architecture in an LTE network, in accordance with certain embodiments.
Figure 2:
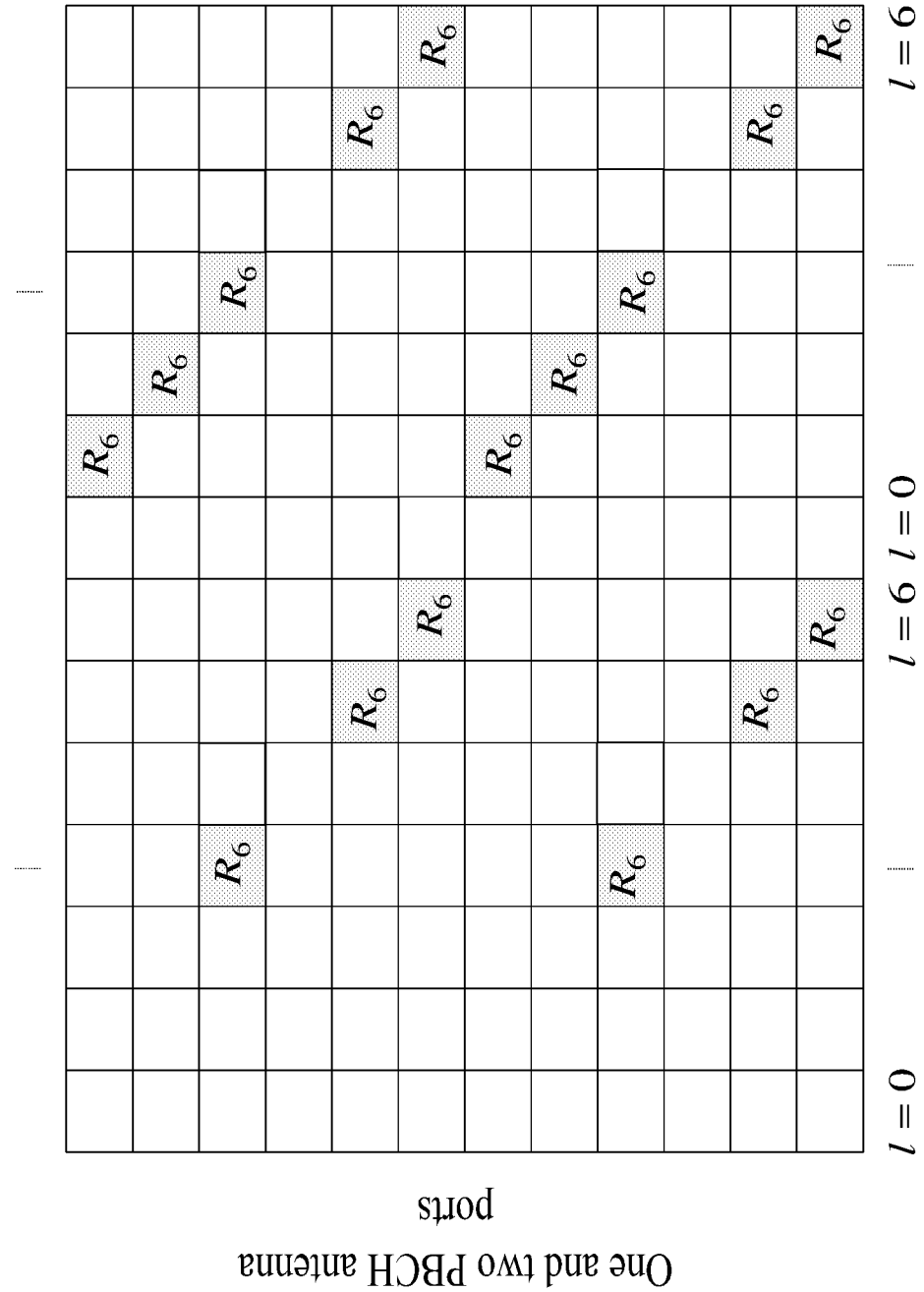
FIG. 2 illustrates an example PRS pattern, in accordance with certain embodiments.
Figure 3:
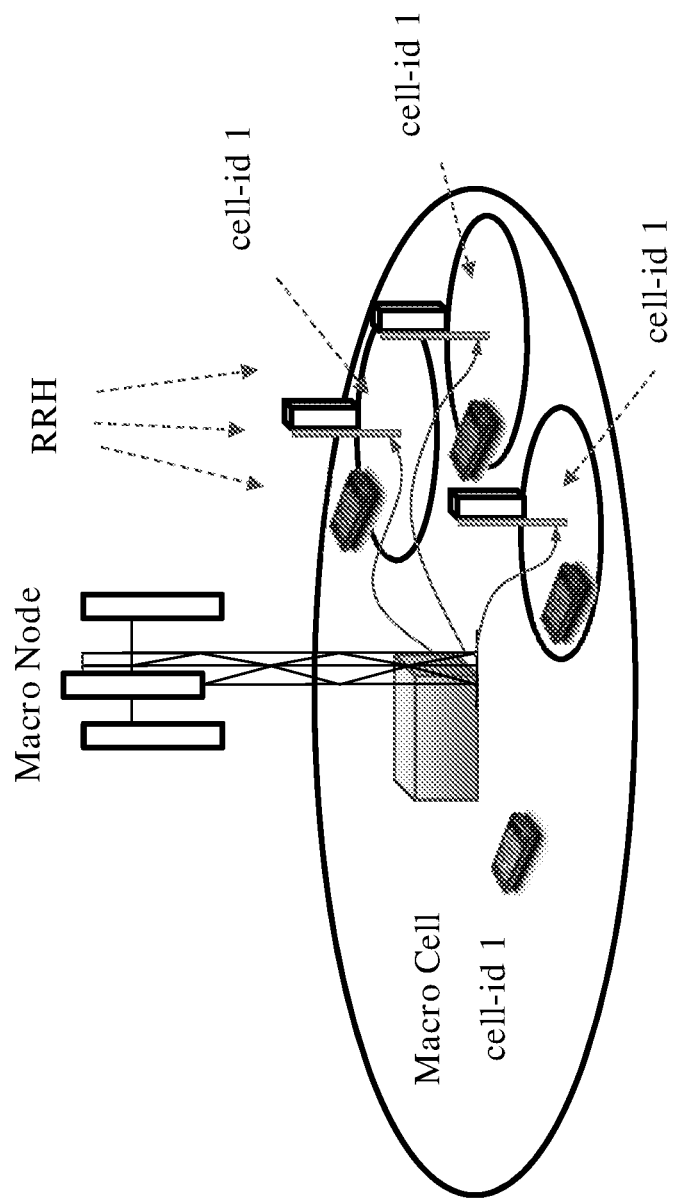
FIG. 3 illustrates an example shared cell comprising one macro cell and several RRHs, in accordance with certain embodiments.
Figure 4:
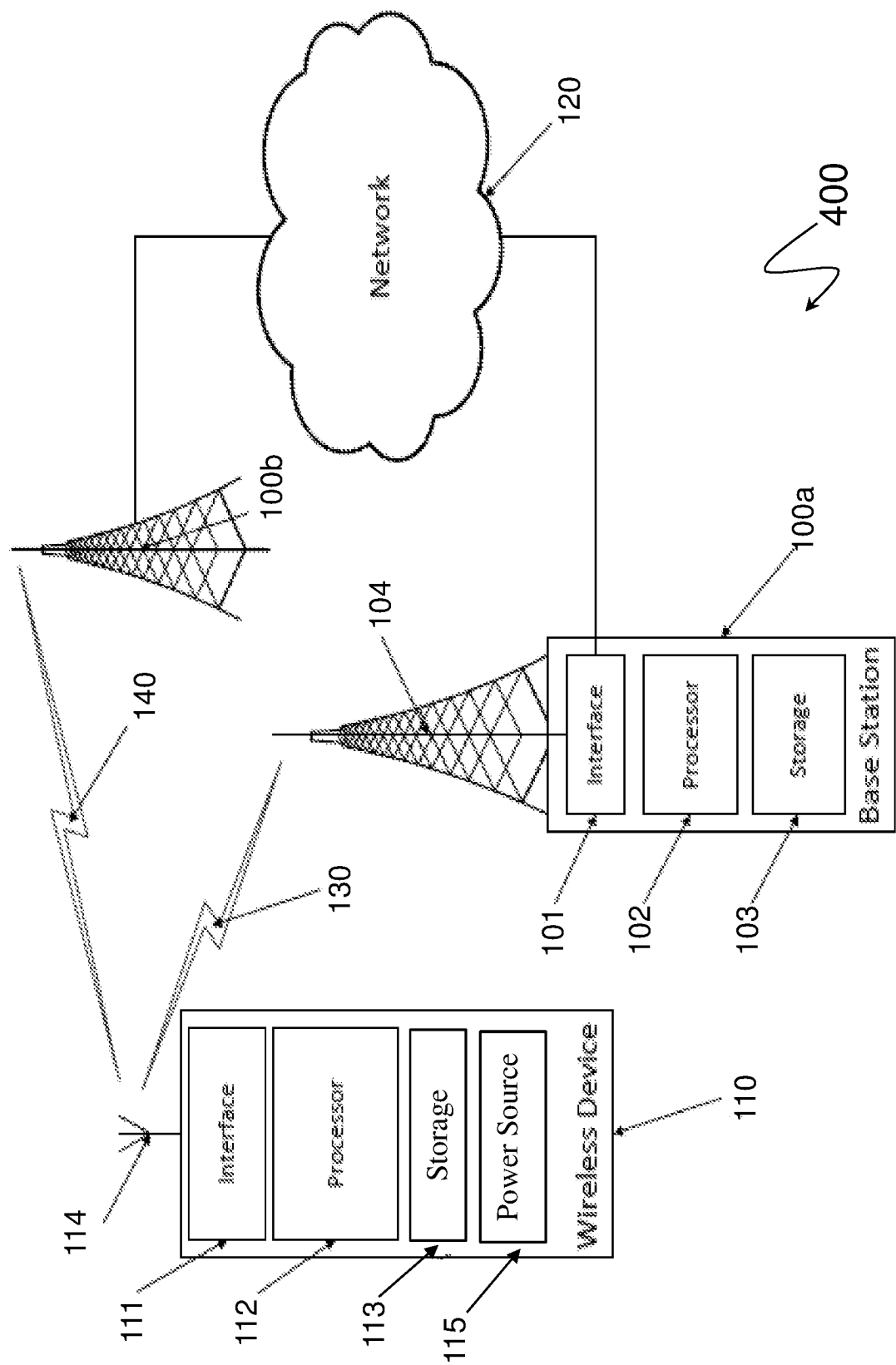
FIG. 4 is a schematic diagram of a wireless communication network, in accordance with certain embodiments.

FIG. 4 is a schematic diagram of a wireless communication network 400, in accordance with certain embodiments. In the illustrated embodiment, FIG. 4 includes network 120, network nodes 100a-b (network node 100a may be referenced generally as "network node 100"), and wireless device 110. Wireless device 110 may be interchangeably referred to as user equipment (UE) 110. In different embodiments, the wireless network may comprise any number of wired or wireless networks, network nodes, base stations (BS), controllers, wireless devices, relay stations, and/or any other components that may facilitate or participate in the communication of data and/or signals whether via wired or wireless connections.

Network 120 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Network node 100 may refer to any kind of network node 100, which may comprise a Node B, base station (BS), radio base station, multi-standard radio (MSR) radio node such as MSR BS, eNode B, network controller, radio network controller (RNC), multi-cell/multicast coordination entity (MCE), base station controller (BSC), relay node, base transceiver station (BTS), access point (AP), radio access point, transmission points, transmission nodes, remote radio unit (RRU), remote radio head (RRH), nodes in distributed antenna system (DAS), core network node (e.g., MSC, MME, SON node, coordinating node, etc.), O&M, OSS, positioning node (e.g., E-SMLC), MDT, an external node (e.g., third-party node, a node external to the current network), or any suitable network node.

Network node 100 comprises interface 101, processor 102, storage 103, and antenna 104. These components are depicted as single boxes located within a single larger box. In practice however, a network node 100 may comprise multiple different physical components that make up a single illustrated component (e.g., interface 101 may comprise terminals for coupling wires for a wired connection and a radio transceiver for a wireless connection). As another example, network node 100 may be a virtual network node in which multiple different physically separate components interact to provide the functionality of network node 100 (e.g., processor 102 may comprise three separate processors located in three separate enclosures, where each processor is responsible for a different function for a particular instance of network node 100). Similarly, network node 100 may be composed of multiple physically separate components (e.g., a NodeB component and a RNC component, a BTS component and a BSC component, etc.), which may each have their own respective processor, storage, and interface components. In certain scenarios in which network node 100 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 100 may be configured to support multiple radio access technologies (RATs). In such embodiments, some components may be duplicated (e.g., separate storage 103 for the different RATs) and some components may be reused (e.g., the same antenna 104 may be shared by the RATs).

Processor 102 may be a combination of one or more of a microprocessor, controller, microcontroller, central processing unit, digital signal processor, application specific integrated circuit, field programmable gate array, processing circuitry, or any other suitable computing device, resource, or combination of hardware, software and/or encoded logic operable to provide, either alone or in conjunction with other network node 100 components, such as storage 103, network node 100 functionality. For example, processor 102 may execute instructions stored in storage 103. Such functionality may include providing various wireless features discussed herein to a wireless devices, such as wireless device 110, including any of the features or benefits disclosed herein.

Storage 103 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 103 may store any suitable instructions, data or information, including software and encoded logic, utilized by network node 100. Storage 103 may be used to store any calculations made by processor 102 and/or any data received via interface 101.

Network node 100 also comprises interface 101, which may be used in the wired or wireless communication of signalling and/or data between network node 100, network 120, and/or wireless device 110. For example, interface 101 may perform any formatting, coding, or translating that may be needed to allow network node 100 to send and receive data from network 120 over a wired connection. Interface 101 may also include a radio transmitter and/or receiver that may be coupled to or a part of antenna 104. The radio may receive digital data that is to be sent out to other network nodes or wireless devices 110 via a wireless connection. The radio may convert the digital data into a radio signal having the appropriate channel and bandwidth parameters. The radio signal may then be transmitted via antenna 104 to the appropriate recipient (e.g., wireless device 110).

Antenna 104 may be any type of antenna capable of transmitting and receiving data and/or signals wirelessly. In some embodiments, antenna 104 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

Wireless device 110 may be any type of wireless endpoint, mobile station, mobile phone, wireless local loop phone, smartphone, user equipment (UE), desktop computer, PDA, cell phone, tablet, laptop, VoIP phone or handset, which is able to wirelessly send and receive data and/or signals to and from a network node, such as network node 100 and/or other wireless devices 110. For example, wireless device 110 may transmit wireless signals to one or more of network nodes 110a-b, and/or receive wireless signals from one or more of network nodes 110a-b. The wireless signals may contain voice traffic, data traffic, control signals, and/or any other suitable information. In some embodiments, an area of wireless signal coverage associated with a network node 110 may be referred to as a cell. In some embodiments, wireless device 110 may have device-to-device (D2D) capability. Thus, wireless device 110 may be able to receive signals from and/or transmit signals directly to another wireless device.

Wireless device 110 comprises interface 111, processor 112, storage 113, antenna 114, and power source 115. Like network node 100, the components of wireless device 110 are depicted as single boxes located within a single larger box, however in practice a wireless device may comprises multiple different physical components that make up a single illustrated component (e.g., storage 113 may comprise multiple discrete microchips, each microchip representing a portion of the total storage capacity).

Interface 111 may be used in the wireless communication of signalling and/or data between wireless device 110 and network node 100. For example, interface 111 may perform any formatting, coding, or translating that may be needed to allow wireless device 110 to send and receive data from network node 100 over a wireless connection. Interface 111 may also include a radio transmitter and/or receiver that may be coupled to or a part of antenna 114. The radio may receive digital data that is to be sent out to network node 100 via a wireless connection. The radio may convert the digital data into a radio signal having the appropriate channel and bandwidth parameters. The radio signal may then be transmitted via antenna 114 to network node 100.

Processor 112 may be a combination of one or more of a microprocessor, controller, microcontroller, central processing unit, digital signal processor, application specific integrated circuit, field programmable gate array, processing circuitry, or any other suitable computing device, resource, or combination of hardware, software and/or encoded logic operable to provide, either alone or in combination with other wireless device 110 components, such as storage 113, wireless device 110 functionality. Such functionality may include providing various wireless features discussed herein, including any of the features or benefits disclosed herein.

Storage 113 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 113 may store any suitable data, instructions, or information, including software and encoded logic, utilized by wireless device 110. Storage 113 may be used to store any calculations made by processor 112 and/or any data received via interface 111.

Antenna 114 may be any type of antenna capable of transmitting and receiving data and/or signals wirelessly. In some embodiments, antenna 114 may comprise one or more omni-directional, sector or panel antennas operable to transmit/receive radio signals between 2 GHz and 66 GHz. For simplicity, antenna 114 may be considered a part of interface 111 to the extent that a wireless signal is being used.

Power source 115 may comprise power management circuitry. Power source 115 may receive power from a power supply, which may either be comprised in, or be external to, power source 115. For example, wireless device 110 may comprise a power supply in the form of a battery or battery pack, which is connected to, or integrated in, power source 115. Other types of power sources, such as photovoltaic devices, may also be used. As a further example, wireless device 110 may be connectable to an external power supply (such as an electricity outlet) via an input circuitry or interface such as an electrical cable, whereby the external power supply supplies power to power source 115. Power source 115 may be electrically coupled to interface 111, processor 112, storage 113, and be configured to supply wireless device 110 with power for performing the functionality described herein.

Figure 8:
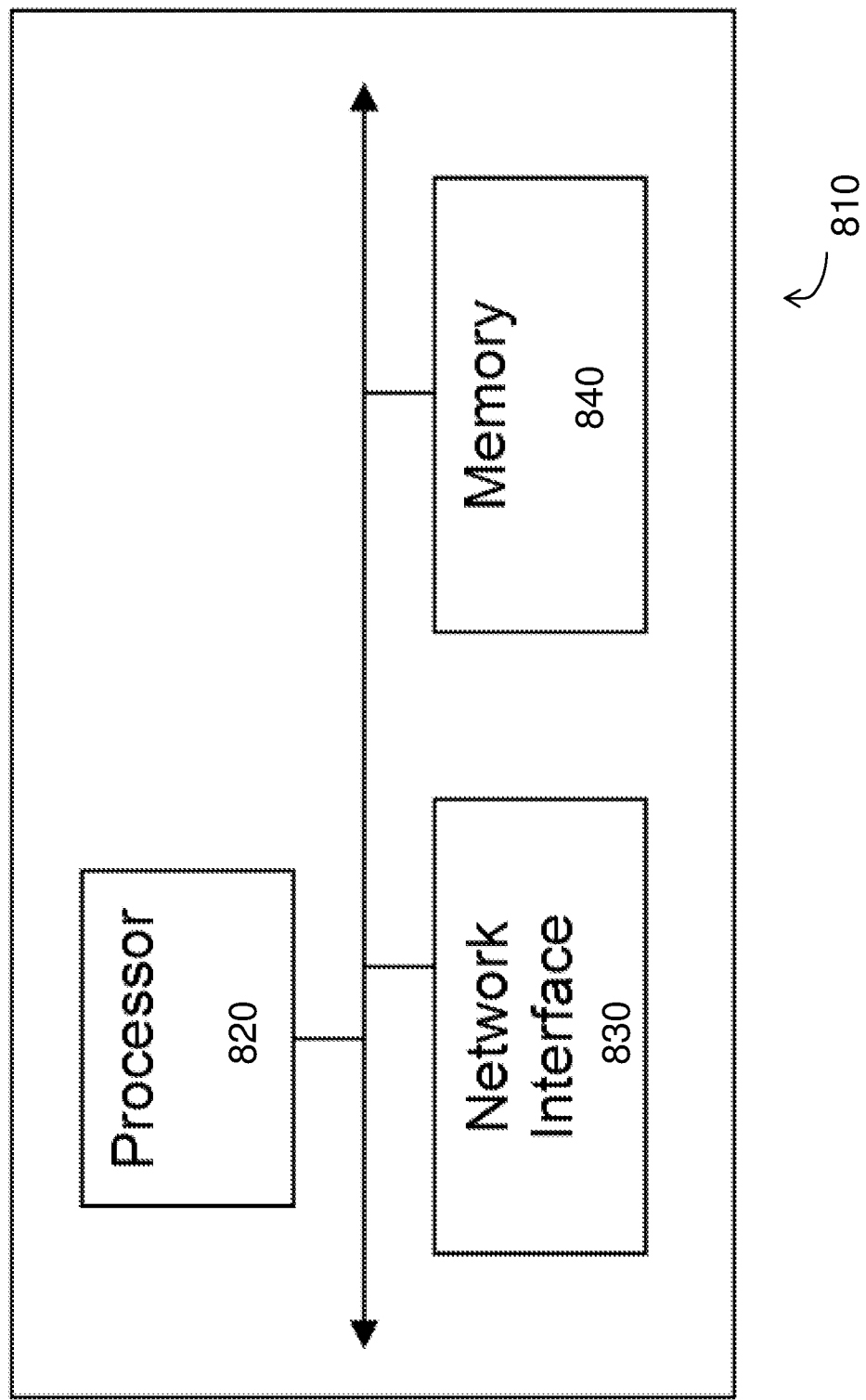
FIG. 8 is a schematic block diagram of an exemplary radio network controller or core network node, in accordance with certain embodiments.

In certain embodiments, network nodes 100 may interface with a radio network controller. The radio network controller may control network nodes 100 and may provide certain radio resource management functions, mobility management functions, and/or other suitable functions. In certain embodiments, the functions of the radio network controller may be performed by network node 100. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a PSTN, a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof. FIG. 8 describes additional functionality of a radio network controller.

In some embodiments, the core network node may manage the establishment of communication sessions and various other functionalities for wireless device 110. Wireless device 110 may exchange certain signals with the core network node using the non-access stratum (NAS) layer. In non-access stratum signaling, signals between wireless devices 110 and the core network node may be transparently passed through the radio access network. In certain embodiments, network nodes 100 may interface with one or more network nodes over an internode interface. For example, network nodes 100a and 100b may interface over an X2 interface.

Although FIG. 4 illustrates a particular arrangement of a wireless network, the present disclosure contemplates that the various embodiments described herein may be applied to a variety of networks having any suitable configuration. For example, the wireless network may include any suitable number of wireless devices 110 and network nodes 100, as well as any additional elements suitable to support communication between wireless devices or between a wireless device and another communication device (such as a landline telephone). Furthermore, although certain embodiments may be described as implemented in a long-term evolution (LTE) network, the embodiments may be implemented in any appropriate type of telecommunication system supporting any suitable communication standards and using any suitable components, and are applicable to any RAT or multi-RAT systems in which the wireless device receives and/or transmits signals (e.g., data). For example, the various embodiments described herein may be applicable to NR, LTE, LTE-Advanced, UMTS, HSPA, GSM, cdma2000, WiMax, WiFi, another suitable radio access technology, or any suitable As described above, the present disclosure contemplates various embodiments that provide for controlling reference TP selection for RSTD measurements. For example, in one embodiment, wireless device 110 may indicate the wireless device 110's capability related to supporting RSTD measurements in a cell with at least two TPs to a first network node 100a. In certain embodiments, one or more but not all TPs in a shared cell may be positioning-relevant TPs. That is, the positioning-relevant TPs transmit signals relevant for positioning. These positioning-relevant TPs may operate as a reference TP. The indication communicated to network node 100a may be provided upon a request or in an unsolicited way, and/or upon a triggering condition or event. For example, in some embodiments, wireless device 110 may communicate its capability to support RSTD measurements in a cell with multiple TPs in response to a request from network node 100.

In some embodiments, wireless device 110 may receive assistance data/information from a second network node 100b. The assistance information may include data associated with a first reference TP. The assistance information may be any suitable data. For instance, the assistance information may include observed time difference of arrival (OTDOA) assistance data received over any suitable communication channel, including but not limited to LPP, LPPe, RRC, and side link (in D2D communications), among others. In some embodiments, the assistance information may further comprise a reference cell associated with the first reference TP.

In some embodiments, the data associated with a reference TP may include, but is not limited to, one or more of the following: TP-specific ID (e.g., a global ID or a TP ID within the associated cell); TP-specific muting pattern; a time-domain and/or frequency-domain transmission pattern or TP transmission scheduling information; a time offset or delay parameter characterizing the TP transmission in time; antenna port configuration or antenna configuration; one or more parameters related to transmission power at TP (e.g., power offset, boosting, deboosting, etc.); carrier frequency; configuration of at least one signal transmitted by the TP; an indication of whether the TP can be used for positioning (i.e., its positioning relevance); and/or a TP location (e.g., absolute or relative).

To further illustrate, below are non-limiting signaling examples 1 and 2 showing a TP data element, which may further comprise TP-specific elements:

Example 1

```
OTDOA-ReferenceCellInfo ::= SEQUENCE {
    physCellId      INTEGER (0..503),
```

```
cellGlobalId       ECGI                    OPTIONAL,  -- Need ON
earfcnRef          ARFCN-ValueEUTRA        OPTIONAL,  -- Cond
  NotSameAsServo
    antennaPortConfig  ENUMERATED  {ports1-or-2, ports4, ... }
                                           OPTIONAL,  -- Cond
  NotSameAsServi
    cpLength       ENUMERATED  {normal, extended, ... },
    prsInfo        PRS-Info                OPTIONAL,  -- Cond
  PRS
  ...,
  referenceTPInfo  TP-Info                 OPTIONAL,
  [[ earfcnRef-v9a0  ARFCN-ValueEUTRA-v9a0  OPTIONAL  -- Cond
  NotSameAsServ2
  ]]
}
```

Example 2

```
OTDOA-ProvideAssistanceData ::= SEQUENCE {
    otdoa-ReferenceCellInfo     OTDOA-ReferenceCellInfo
    OPTIONAL,  -- Need ON
    otdoa-ReferenceTPInfo       OTDOA-ReferenceTPInfo
    OPTIONAL,  -- Need ON
    otdoa-NeighbourCellInfo     OTDOA-NeighbourCellInfoList
    OPTIONAL,  -- Need ON
    otdoa-Error                 OTDOA-Error OPTIONAL, -- Need ON
    ...
}
```

Example 2 shows otdoa-ReferenceCellInfo and otdoa-ReferenceTPInfo. In some embodiments, both otdoa-ReferenceCellInfo and otdoa-ReferenceTPInfo may be signaled together. In some embodiments, only one of otdoa-ReferenceCellInfo and otdoa-ReferenceTPInfo may be signaled. For example, if the reference is a TP then otdoa-ReferenceTPInfo is to be provided, otherwise otdoa-ReferenceCellInfo can be provided.

In some embodiments, the first reference TP may be used as a reference for at least one RSTD measurement and wireless device 110 uses the data associated with a reference TP to perform an RSTD measurement.

In some embodiments, wireless device 110 may reselect a reference TP (i.e., a second reference TP). Wireless device 110 may perform an second RSTD measurement for this second reference TP in addition to, or alternative to, performing the first RSTD measurement for the first reference TP. For example, wireless device 110 may determine that the first reference TP does not provide an acceptable RSTD measurement (e.g., the RSTD measurement does not meet an accuracy requirement; and/or the PRS SINR is not greater than a required decibel, among others). Wireless device 110 may select a second reference TP, different from the first reference TP, and calculate a second RSTD measurement from the second reference TP. In some embodiments, wireless device 110 may not calculate a RSTD measurement from the first reference TP and, instead, determine a different, second reference TP. Wireless device 110 may then calculate an RSTD measurement from the second reference TP.

Wireless device 110 may use any suitable procedure to select a second reference TP. For example, and not by way of limitation, wireless device 110 may make the second reference TP selection based on one or more of the following:

A pre-defined rule (e.g., the reference TP is selected in associated with the cell with the smallest number of TPs or with the number of TPs below a threshold; a candidate reference TP should have the necessary signals transmissions with periodicity not longer than a threshold, among others);

Based on a pre-configuration in the UE;

Historical information stored in the UE;

An indication or configuration in a message received from a network node 100;

One or more measurements (e.g., a TP with best performance characteristic or meeting a certain criteria such as shortest TOA, best signal strength or signal quality, the signal quality above a threshold);

The contents of the assistance data (e.g., the OTDOA assistance data may indicate explicitly or implicitly which TP is to be selected as the second reference TP in case the first reference TP does not meet a criteria);

The order of TPs in the assistance data (e.g., if the first reference TP does not meet a criteria the second TP in the order is selected as the second reference TP);

Performance characteristics of the TP (e.g., a candidate reference TP may have transmission timing error below a threshold, be within a distance or timing with respect to the UE not larger than a threshold, provide signal strength or signal quality above a threshold, among others).

To illustrate, in one embodiment, the second reference TP may provide the strongest signal or be the closest in proximity to wireless device 110 in a serving cell. In another example, the second reference TP may be the strongest or closest TP in a neighbor cell. In some embodiments, wireless device 110 may perform one or more measurements to determine a second reference TP selection. In some embodiments, wireless device 110 may reselect the same TP; thus, the first and the second reference TPs may be the same in some embodiments.

The selection of a second reference TP, may be triggered by a certain event or condition. Such events or conditions may include, but are not limited to, when the signal strength dropped below a threshold; when a cell change occurs and/or when the first reference TP signal performance characteristic is above a threshold (e.g., due to mobility). The second reference TP may be selected to be associated with the same cell as the first reference TP or with a different cell. In the latter, the second reference TP selection may be preceded by first selecting the cell with which the second reference TP would be associated.

If wireless device 110 selects a second reference TP, in some embodiments, wireless device 110 may indicate the second reference TP to a network node 100. In some embodiments, the indication may further comprise a reference cell associated with the second reference TP. Wireless device 110 may communicate the indication to network node 100 when the first and the second reference TPs are different, otherwise it may be assumed that the reference TP for a reported RSTD measurement is the same as was provided in the OTDOA assistance data. However, it is also contemplated that the second reference TP is always indicated, even if it is the same as the first reference TP. The indication may further comprise other data about the TP, for example, any of TP-related data described above. To further illustrate, a non-limiting example 3 is described below:

Example 3

```
OTDOA-SignalMeasurementInformation ::= SEQUENCE {
    systemFrameNumber BIT STRING (SIZE (10)),
```

```
    physCellIdRef       INTEGER (0..503),
    cellGlobalIdRef         ECGI            OPTIONAL,
    earfcnRef           ARFCN-ValueEUTRA OPTIONAL, -- Cond
NotSameAsRefo
    tpIdRef             ID-TP                   OPTIONAL,
    referenceQuality    OTDOA-MeasQuality OPTIONAL,
    neighbourMeasurementList NeighbourMeasurementList,
    ...,
    [[ earfcnRef-v9a0   ARFCN-ValueEUTRA-v9a0 OPTIONAL -- Cond
NotSameAsRefi
    ]]
}
```

In example 3 above, if tpIdRef is included then referenceQuality may also be provided not for the reference cell but for the reference TP.

After calculation a first and/or second RSTD measurement with respect to the first and/or second reference TPs, wireless device 110 may communicate the first and/or second RSTD measurement(s) to a network node 100. Wireless device 110 may communicate the RSTD measurement(s) the same network node 100 that communicated the assistance information to wireless device 110. In certain embodiments, wireless device 110 may communicate the RSTD measurement(s) to a different network node 100.

Additionally or alternatively, wireless device 110 may utilize the RSTD measurement(s) for one or more operational tasks. Non-limiting examples of operational tasks may include positioning, controlling wireless device 110 transmit timing or for timing advance, RRM, storing in an internal or external database, and self-organizing networks (SON), among others.

Any appropriate steps, methods, or functions may be performed through a computer program product that may, for example, be executed by the components and equipment illustrated in the figure above. For example, storage 103 may comprise non-transitory computer readable means on which a computer program can be stored. The computer program may include instructions which cause processor 102 (and any operatively coupled entities and devices, such as interface 101 and storage 103) to execute methods according to embodiments described herein. The computer program and/or computer program product may thus provide means for performing any steps herein disclosed.

Figure 5:
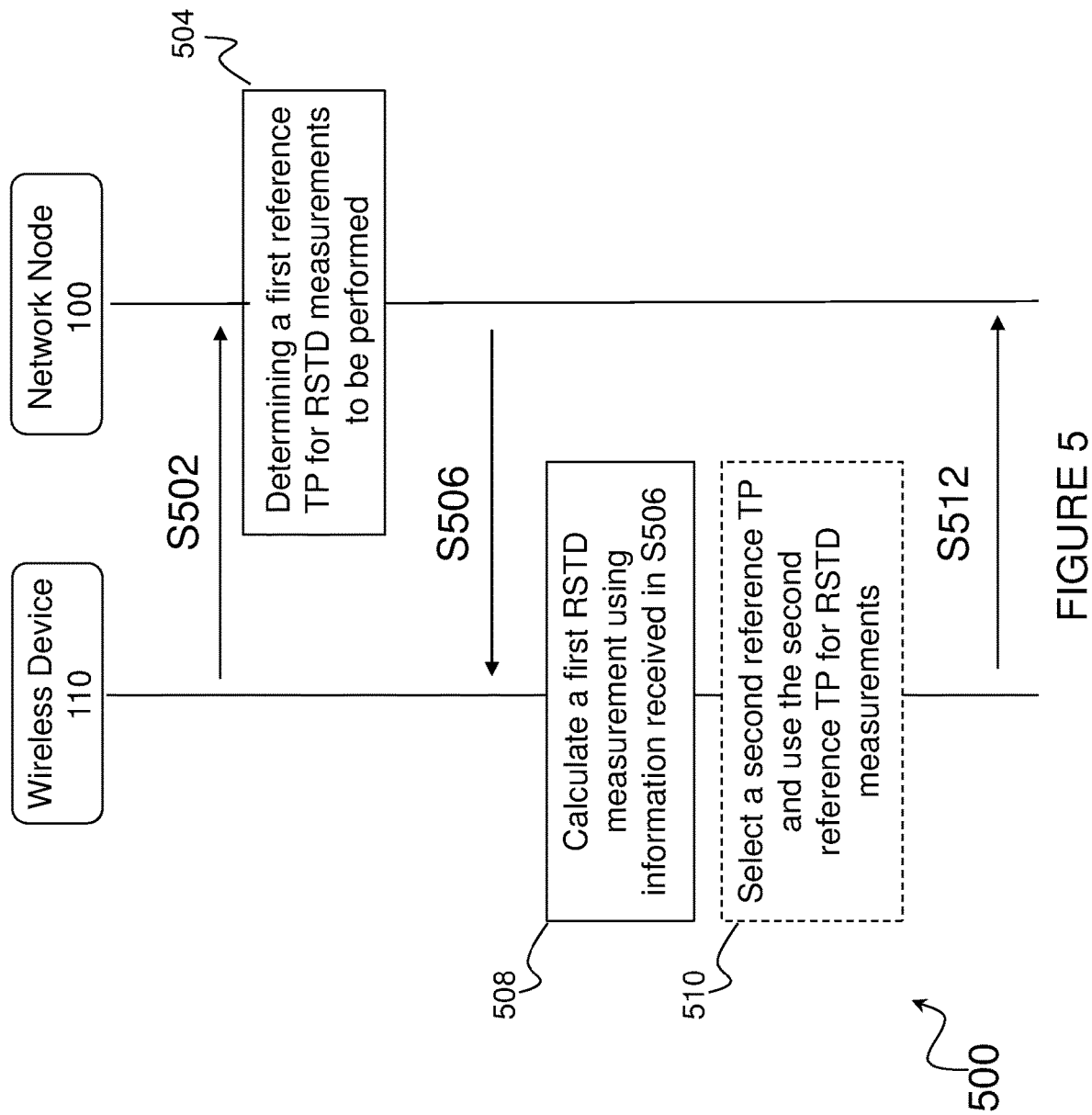
FIG. 5 illustrates a signal flow diagram for controlling reference TP selection for RSTD measurements, in accordance with certain embodiments.

FIG. 5 illustrates a signal flow diagram 500 for controlling reference TP selection for RSTD measurements, in accordance with certain embodiments. Signal flow diagram 500 describes an example signaling protocol between network node 100 and wireless device 110 that allows wireless device to control the selection of a reference TP to calculate a RSTD measurement based on that reference TP.

In the illustrated embodiment, wireless device 110 communicates signal S502 to network node 100. Signal S502 may provide an indication to network node 100 a capability of wireless device 110 to support RSTD measurements in cells with at least two TPs. In some embodiments, this capability can be accounted for by network node 100 when creating assistance data for wireless device 110. For example, by receiving the indication from wireless device 110, network node 100 may include data about/associated with a reference TP in the assistance data network node 100 later communicates to wireless device 110. In some embodiments, network node 100 may receive the indication from wireless device 110 in response to sending a request for such capability, or it may be receiving in an unsolicited way (e.g., upon an event or condition at the UE).

At step 504, network node 100 may determine a first reference TP for RSTD measurements to be performed by wireless device 110. In some embodiments, the determining of the first reference TP may also comprise obtaining data about one or more TPs (which may include the first reference TP) from another network node (e.g., another network node such as O&M, an eNodeB or positioning node or UE). The data may be received from the other network node over any suitable communication channel, including but not limited to a X2 or a like interface or via LPPa protocol. The data may be received by network node 100 proactively or upon an explicit or implicit request from the network node.

The data about one or more TPs may comprise any suitable information, including the TP-related elements described above (i.e., the data associated with a reference TP). The data may also comprise the number of TPs associated with a specific cell, positioning relevance of individual TPs (e.g., availability of specific positioning signals), a rule or pattern describing relation between TP transmissions in the cell (e.g., different TPs are transmitting sequentially in a certain order with a certain time interval between the different TPs' transmissions and then repeat in the same order), among others. In some embodiments, in a set of TPs associated with the same cell, there may be only one or some TPs but not all that are positioning-relevant TPs. The information about such positioning-relevant TPs may also be provided by an associated cell/node or controlling node (e.g., O&M). The data about one or more TPs may be further stored in the network node.

Methods for selecting a TP to become the first reference TP for wireless device 110, from a set of TPs, may be similar to selecting methods for the second reference TP in wireless device 110 described above. For example, and not by way of limitation, the selecting may be based on one or more of:

A pre-defined rule,
An indication or suggestion by the node associated with the TP (e.g., an eNodeB may recommend one of its TPs as a reference),
Historical information stored in the network node,
An indication or configuration in a message received from another node (e.g., a controlling node such as O&M),
Based on collected measurement statistics from one or more wireless devices 110,
Wireless device 110 measurements (e.g., prior to configuring RSTD measurements the network node may request some measurements from wireless device 110, which can then be indicative of which TP is best suited as a reference TP).

Once network node 100 has determined a first reference TP for RSTD measurements to be performed, network node 100 may communicate signal S506 to wireless device 110. Signal S506 may comprise assistance data to wireless device 110. The assistance data may comprise data about the first reference TP. In some embodiments, the data associated with the first reference TP may further comprise a reference cell associated with the first reference TP.

At step 508, wireless device 110 may receive the assistance data from network node 100 and calculate a first RSTD measurement using the assistance data. As explained above, the assistance data may be used as part of a location determining process (e.g., TOA, TDOA, OTDOA, among others). The assistance data may comprise data associated with a first reference TP. The data associated with a first reference TP may include, but is not limited to, data such as a TP-specific ID (e.g., a global ID or a TP ID within the associated cell), or a TP-specific muting pattern, among others.

In some embodiments, wireless device 110 may perform step 510 and select a second reference TP. For example, in certain embodiments, wireless device 110 may determine that the first reference TP is no longer adequate for use as a reference TP when performing an RSTD measurement. Wireless device 110 may select a second reference TP, different from the first reference TP, and calculate a second RSTD measurement using the second reference TP. As described above in reference to FIG. 4 the selection of a second reference TP may be based on one or more factors.

Once wireless device 110 has calculated a first and/or second RSTD measurement, wireless device may communicate signal S512 to network node 100. In certain embodiments signal S512 may include an indication from wireless device 110 of a second reference TP used by wireless device 110 to calculate a RSTD measurement. For example, the indication may comprise a reference cell associated with the second reference TP. In some embodiments, wireless device 110 may communicate one or more RSTD measurement(s) to network node 100. In certain embodiments, the RSTD measurement(s) may be based on the data associated with the first reference TP provided to wireless device 100 in signal S506. The RSTD measurement results may be provided to network node 100 as part of a measurement report.

Although the illustrated embodiment shows wireless device 110 communicating signal S512 to network node 100, wireless device 110 may communicate signal S512 to any suitable node in wireless communication network 400. Moreover, although signal S512 is illustrated as a single signal, wireless device 110 may communicate the information contained in signal S512 in multiple transmissions. Additionally, any steps described herein in regards to FIG. 5 is merely illustrative of certain embodiments. In some embodiments, additional steps may be performed by wireless device 110 and/or network node 100. In some embodiments, certain illustrated steps may be omitted (e.g., the dashed lined steps), or performed in a different order. For example, in some embodiments wireless device 110 may not communicate signal S502 to network node 100.

Figure 6:
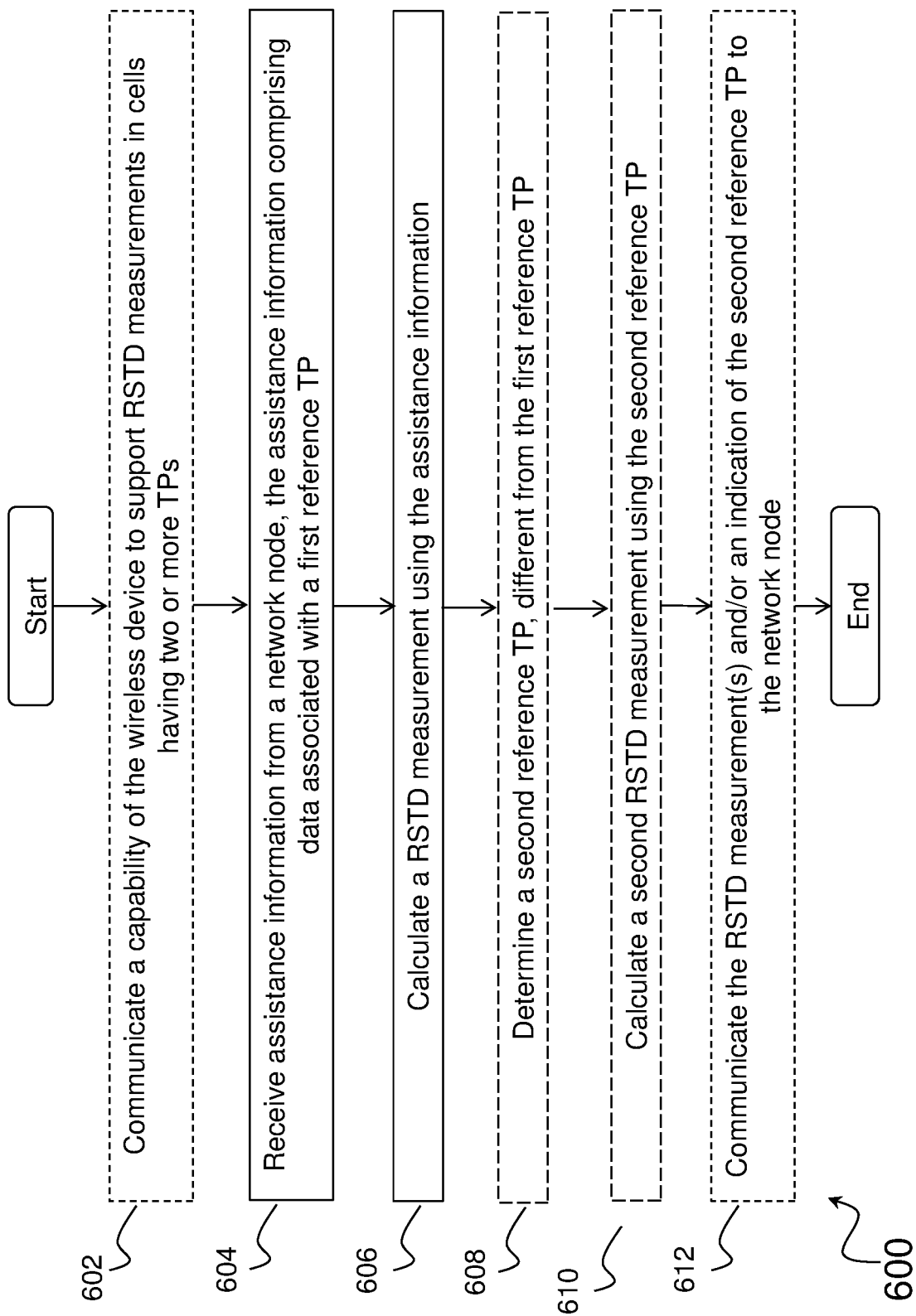
FIG. 6 is a flow chart of a method in a wireless device for controlling reference TP selection for RSTD measurements, in accordance with certain embodiments.

FIG. 6 is a flow chart of a method 600 in wireless device 110 for controlling reference TP selection for RSTD measurements, in accordance with certain embodiments. In some embodiments, method 600 may be performed by wireless device 110 for improving RSTD measurements by controlling reference TP selection. At step 602 wireless device 110 may indicate/communicate to a first network node 100a the wireless device's capability related to supporting RSTD measurements in a cell with at least two TPs. In some embodiments, the indication may be provided upon a request or in an unsolicited way, and/or upon a triggering condition or event. For example, in some embodiments, wireless device 110 may communicate its capability to support RSTD measurements in a cell with multiple TPs in response to a request from network node 100.

At step 604 wireless device 110 may receive assistance data/information from a network node 100. The assistance information may include data about or associated with a first reference TP. The assistance information may be any suitable data. For instance, the assistance information may include observed time difference of arrival (OTDOA) assistance data received over any suitable communication channel, including but not limited to LPP, LPPe, RRC, and side link (in D2D communications), among others. In some embodiments, the assistance information may further comprise a reference cell associated with the first reference TP.

In some embodiments, the data associated with a reference TP may include, but is not limited to, one or more of the following:
- TP-specific ID (e.g., a global ID or a TP ID within the associated cell);
- TP-specific muting pattern; a time-domain and/or frequency-domain transmission pattern or TP transmission scheduling information; a time offset or delay parameter characterizing the TP transmission in time; antenna port configuration or antenna configuration;
- one or more parameters related to transmission power at TP (e.g., power offset, boosting, deboosting, etc.);
- carrier frequency;
- configuration of at least one signal transmitted by the TP; and/or
- an indication of whether the TP can be used for positioning (i.e., its positioning relevance); and/or a TP location (e.g., absolute or relative).

At step 606, wireless device 110 may calculate a RSTD measurement using the assistance information received from network node 100. For example, in some embodiments, wireless device 110 uses the data associated with a reference TP, wireless device 110 and performs an RSTD measurement. In certain embodiments, the first reference TP may be used as a reference for at least one RSTD measurement.

At step 608, wireless device 110 may reselect a reference TP (i.e., a second reference TP). Wireless device 110 may perform an RSTD measurement for this second reference TP in addition to, or alternative to, performing the RSTD measurement for the first reference TP. For example, wireless device 110 may determine that the first reference TP does not provide an acceptable RSTD measurement according to one or more standards. Accordingly, wireless device 110 may select a second reference TP, different from the first reference TP. In some embodiments, wireless device 110 may not calculate a RSTD measurement from the first reference TP and instead determine a different, second reference TP. As explained above in regards to FIG. 4, Wireless device 110 may use any suitable procedure to select a second reference TP. At step 610, wireless device 110 may calculate a second RSTD measurement using the second reference TP.

At step 612, wireless device 110 may communicate the RSTD measurement(s) and/or an indication of the second reference TP to network node 100. If wireless device 110 selects a second reference TP, in some embodiments, wireless device 110 may indicate the second reference TP to a network node 100. In some embodiments, the indication may further comprise a reference cell associated with the second reference TP.

In one embodiment, the indication is included when the first and the second reference TPs are different, otherwise it may be assumed that the reference TP for a reported RSTD measurement is the same as was provided in the OTDOA assistance data. In yet another example, the second reference TP is always indicated, even if it is the same as the first reference TP.

Figure 7:
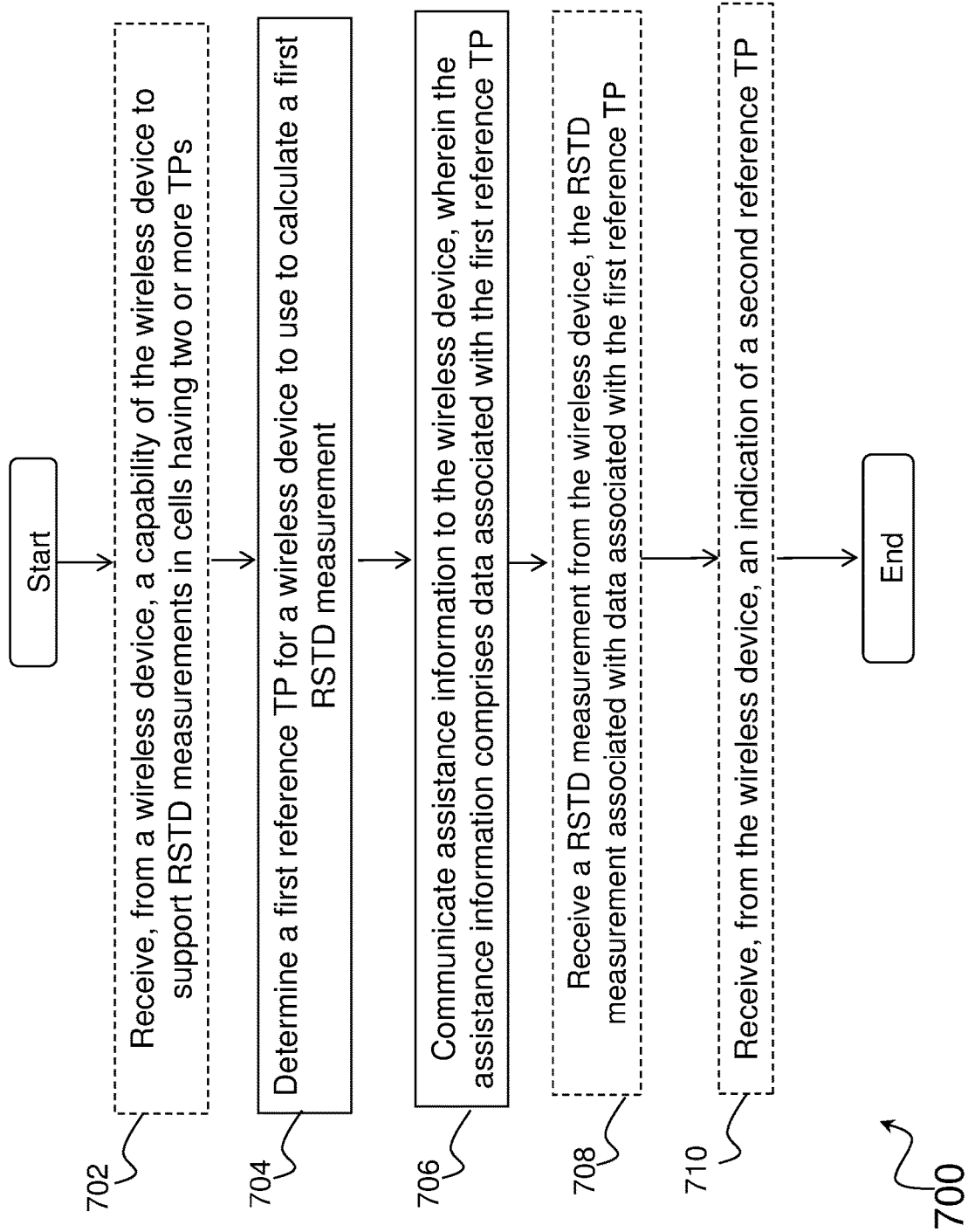
FIG. 7 is a flow chart of a method in a network node for controlling reference TP selection for RSTD measurements, in accordance with certain embodiments.

FIG. 7 is a flow chart of a method 700 in a network node 100 for controlling reference TP selection for RSTD measurements, in accordance with certain embodiments. At step 702, network node 100 may receive, from wireless device 110, a capability of wireless device 110 to support RSTD measurements in a cell(s) having two or more TPs. In some embodiments, network node 100 may utilize the capability information when the assistance data is created and transmitted to wireless device 110. In some embodiments, network node 100 may receive the capability information in response to sending a request for such capability (not shown), or it may be receiving in an unsolicited way (e.g., upon an event or condition at the UE).

At step 704, network node 100 may determine a first reference TP for a wireless device to use to calculate a first RSTD measurement. As described above in regards to FIGS. 4 and 5, network node 100 may determine the first reference TP using one or more methods, including but not limited to, using a pre-defined rule, historical information, an indication from the node associated with the TP, among others.

At step 706, network node 100 may communicate assistance information to wireless device 110. The assistance information may comprise data associated with the first reference TP. As described above in reference to FIGS. 4 and 5, the assistance information comprising data associated with the first reference TP may comprise any suitable information/data. In some embodiments, the data associated with eh first reference TP may comprise a reference cell associated with the first reference TP.

At step 708, network node 100 may receive a RSTD measurement from wireless device 110. In some embodiments, The RSTD measurement may be associated with the data associated with the first reference TP that network node 100 communicated at step 706. In some embodiments, the RSTD measurements may be provided in a measurement report.

At step 710, network node may receive, from wireless device 110, an indication of a second reference TP. In some embodiments, network node 100 may also receive a second RSTD measurement from wireless device 110. The second RSTD measurement may be associated with the second reference TP. In some embodiments, the indication may further comprise a reference cell associated with the second reference TP.

Any steps described herein in regards to FIGS. 6 and 7 are merely illustrative of certain embodiments. It is not required that all embodiments incorporate all the steps disclosed nor that the steps be performed in the exact order depicted or described herein. For example, in certain embodiments wireless device 110 may skip steps 602 and/or 608 when performing method 600. Similarly, in certain embodiments, network node 100 may not perform steps 702 and/or 710 when performing method 700. Furthermore, some embodiments may include steps not illustrated or described herein, including steps inherent to one or more of the steps disclosed herein. For example, in addition to or instead of performing step 608 in method 600, wireless device 110 may use the calculated RSTD measurement for an operational task, such as controlling wireless device transmit timing or determining its own position using a measurement technique, like OTDOA.

FIG. 8 is a schematic block diagram of an exemplary radio network controller or core network node 810, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 810 includes processor 820, memory 830, and network interface 840. In some embodiments, processor 820 executes instructions to provide some or all of the functionality described above as being provided by the network node, memory 830 stores the instructions executed by processor 820, and network interface 840 communicates signals to any suitable node, such as a gateway, switch, router, Internet, Public Switched Telephone Network (PSTN), network nodes 100, radio network controllers or core network nodes 810, etc.

Processor 820 may include any suitable combination of hardware and software implemented in one or more modules to execute instructions and manipulate data to perform some or all of the described functions of the radio network controller or core network node 810. In some embodiments, processor 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processor 820 and may refer to any suitable device operable to receive input for the network node, send output from the network node, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Other embodiments of the network node may include additional components beyond those shown in FIG. 8 that may be responsible for providing certain aspects of the network node's functionality, including any of the functionality described above and/or any additional functionality (including any functionality necessary to support the embodiments described above).

Figure 9:
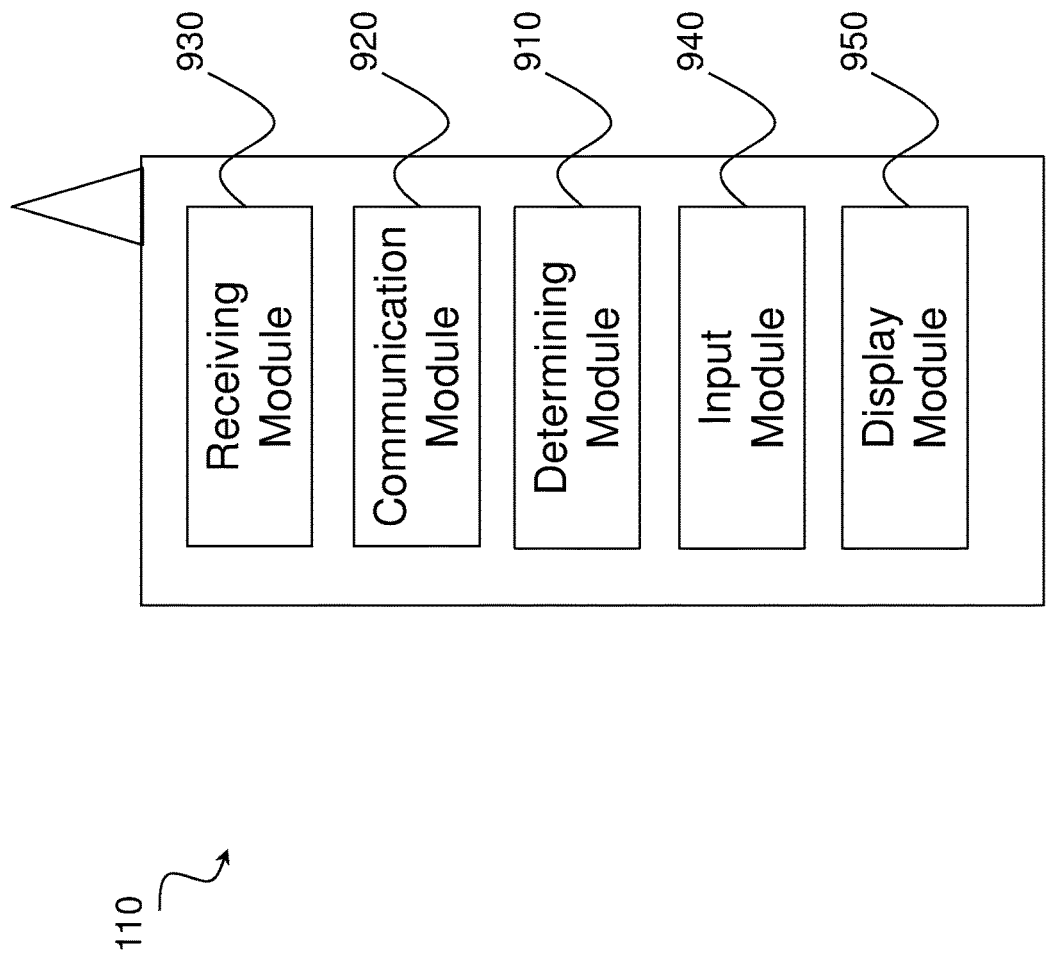
FIG. 9 is a schematic block diagram of an exemplary wireless device, in accordance with certain embodiments.

FIG. 9 is a schematic block diagram of an exemplary wireless device 110, in accordance with certain embodiments. Wireless device 110 may include one or more modules. For example, wireless device 110 may include a determining module 910, a communication module 920, and a receiving module 930. Optionally, wireless device 110 may include an input module 940, a display module 950, and any other suitable modules. Wireless device 110 may perform the selection of a reference TP for RSTD measurements as described above with respect to FIGS. 4-7.

Determining module 910 may perform the processing functions of wireless device 110. In certain embodiments, wireless device 110 may perform any of the functions described above with respect to FIGS. 4-7. In one example embodiment, determining module 910 may determine/calculate an RSTD measurement using the assistance information received from network node 100. For example, in some embodiments, the assistance information may include a TP-specific ID. Wireless device 110 may identify a reference TP using the TP-specific ID. Wireless device 110 may then select the TP to be an RSTD measurement reference. In some embodiments, determining module 910 may determine a location estimate of wireless device 110 using the RSTD measurement by performing a location technique (e.g., OTDOA).

Determining module 910 may include or be included in one or more processors, such as processor 112 described above in relation to FIG. 4. Determining module 910 may include analog and/or digital circuitry configured to perform any of the functions of determining module 910 and/or processor 112 described above. The functions of determining module 910 described above may, in certain embodiments, be performed in one or more distinct modules.

Communication module 920 may perform the communication functions of wireless device 110. In certain embodiments, communication module 920 may perform any of the communication functions described above with respect to FIGS. 4-7. In some embodiments, communication module 920 may communicate a capability of wireless device 110 to support RSTD measurements in cells having two or more TPs. In some embodiments, communication module 920 may also communicate an RSTD measurement calculated by determining module 910 to network node 100. As another example, communication module 920 may transmit the signals disclosed in FIG. 5 (signals S502 and S510).

Communication module 920 may transmit messages to one or more of network nodes 100a-b of the wireless network described in FIG. 4. Communication module 920 may include a transmitter and/or a transceiver, such as interface 111 and/or antenna 114 described above in relation to FIG. 4. Communication module 920 may include circuitry configured to wirelessly transmit messages and/or signals. In particular embodiments, communication module 920 may receive messages and/or signals for transmission from determining module 910. In certain embodiments, the functions of communication module 920 described above may be performed in one or more distinct modules.

Receiving module 930 may perform the receiving functions of wireless device 110. In certain embodiments, receiving module 930 may perform any of the receiving functions of wireless device 110 described above with respect to FIGS. 4-7. In one example embodiment, receiving module 930 may receive assistance information from network node 100. In some embodiments, the assistance information may comprise data associated with a first reference TP. Examples of data associated with a first reference TP include, but are not limited to: a reference cell associated with the first reference TP; a TP-specific ID (e.g., a global ID or a TP ID within the associated cell); a TP-specific muting pattern; a time-domain and/or frequency-domain transmission patter; TP transmission scheduling information; a time offset or delay parameter characterizing the TP transmission in time; antenna port configuration or antenna configuration; one or more parameters related to transmission power at TP (e.g., power offset, boosting, deboosting, etc.); a carrier frequency; a configuration of at least one signal transmitted by the TP; an indication of whether the TP can be used for positioning (i.e., its positioning relevance); and a TP location (e.g., absolute or relative); among others.

Receiving module 930 may include a receiver and/or a transceiver, such as interface 111 and/or antenna 114 described above in relation to FIG. 4. Receiving module 930 may include circuitry configured to wirelessly receive messages and/or signals. In particular embodiments, receiving module 930 may communicate received messages and/or signals to determining module 910.

Optionally, wireless device 110 may include input module 940. Input module 940 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 910.

Optionally, wireless device 110 may include display module 950. Display module 950 may present signals on a display of wireless device 110. Display module 950 may include the display and/or any appropriate circuitry and hardware configured to present signals on the display. Display module 950 may receive signals to present on the display from determining module 910.

Determining module 910, communication module 920, receiving module 930, input module 940, and display module 950 may include any suitable configuration of hardware and/or software. Wireless device 110 may include additional modules beyond those shown in FIG. 9 that may be responsible for providing any suitable functionality, including any of the functionality described above and/or any additional functionality (including any functionality necessary to support the various solutions described herein).

Figure 10:
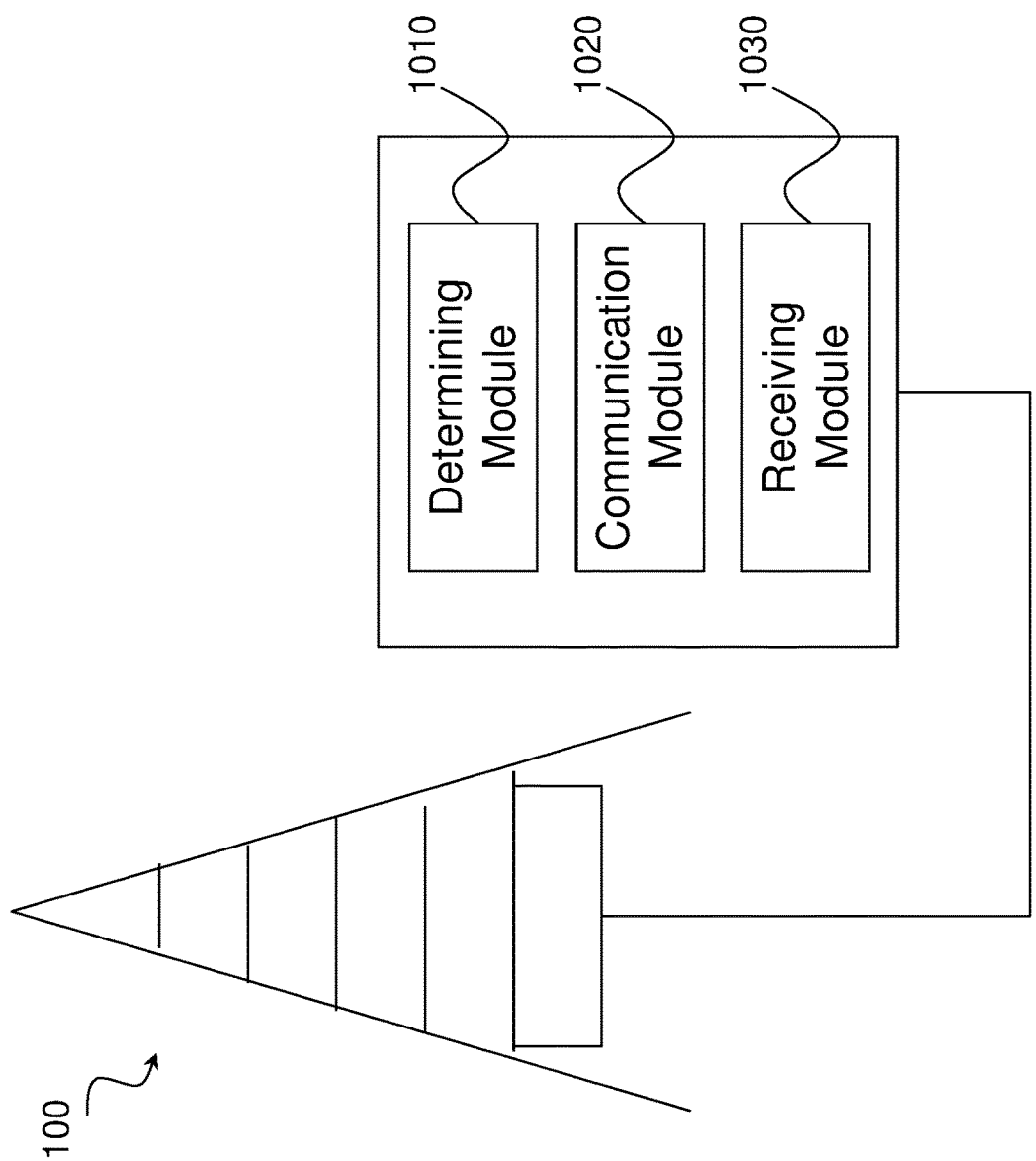
FIG. 10 is a schematic block diagram of an exemplary network node, in accordance with certain embodiments.

FIG. 10 is a block schematic of an exemplary network node 100, in accordance with certain embodiments. Network node 100 may include one or more modules. For example, network node 100 may include determining module 1010, communication module 1020, receiving module 1030, and any other suitable modules. In some embodiments, one or more of determining module 1010, communication module 1020, receiving module 1030, or any other suitable module may be implemented using one or more processors, such as processor 102 described above in relation to FIG. 4. In certain embodiments, the functions of two or more of the various modules may be combined into a single module. Network node 100 may perform one or more steps to control reference TP selection for RSTD measurements as described above in reference to FIGS. 4-7.

Determining module 1010 may perform the processing functions of network node 100. In certain embodiments, determining module 1010 may perform any of the functions of network node described above with respect to FIGS. 4-7. In one example embodiment, determining module 1010 may determine a first reference TP for wireless device 110 to use to calculate a first RSTD measurement. In some embodiments, after receiving one or more RSTD measurements from wireless device 110, determining module 1010 may use the RSTD measurement to determine a location estimate of wireless device 1010 using one or more location techniques (e.g., OTDOA).

Determining module 1010 may include or be included in one or more processors, such as processor 102 described above in relation to FIG. 4. Determining module 1010 may include analog and/or digital circuitry configured to perform any of the functions of determining module 1010 and/or processor 102 described above. The functions of determining module 1010 may, in certain embodiments, be performed in one or more distinct modules. For example, in certain embodiments some of the functionality of determining module 1010 may be performed by an allocation module.

Communication module 1020 may perform the transmission functions of network node 100. In certain embodiments, network node 100 may perform any of the functions of the node described above with respect to FIGS. 4-7. In one example embodiment, communication module 1020 may transmit/communicate assistance information to wireless device 110. The assistance information may include data associated with the first reference TP. For example, the data associated with the first reference TP may include, but is not limited to a reference cell associated with the first reference TP; a TP-specific ID (e.g., a global ID or a TP ID within the associated cell); a TP-specific muting pattern; a time-domain and/or frequency-domain transmission patter; TP transmission scheduling information; a time offset or delay parameter characterizing the TP transmission in time; antenna port configuration or antenna configuration; one or more parameters related to transmission power at TP (e.g., power offset, boosting, deboosting, etc.); a carrier frequency; a configuration of at least one signal transmitted by the TP; an indication of whether the TP can be used for positioning (i.e., its positioning relevance); and a TP location (e.g., absolute or relative); among others.

Communication module 1020 may transmit messages to one or more of wireless devices 110. Communication module 1020 may include a transmitter and/or a transceiver, such as transceiver 1010 described above in relation to FIG. 4. Communication module 1020 may include circuitry configured to wirelessly transmit messages and/or signals. In particular embodiments, communication module 1020 may receive messages and/or signals for transmission from determining module 1010 or any other module.

Receiving module 1030 may perform the receiving functions of network node 100. In certain embodiments, receiving module 1030 may perform any of the functions of network node 100 described in FIGS. 4-7. In one example embodiment, receiving module 1030 may receive, from wireless device 110, a capability of wireless device 110 to support RSTD measurements in cells having two or more TPs. In some embodiments, receiving module 1030 may receive a RSTD measurement from wireless device 110. The RSTD measurement may be associated with data associated with the first reference TP. For example, wireless device 110 may utilize the data associated with a first reference TP to select a TP to use as a reference TP.

Receiving module 1030 may receive any suitable information from wireless device 110 Receiving module 1030 may include a receiver and/or a transceiver, such as interface 101 and/or antenna 104, which are described above in relation to FIG. 4. Receiving module 1030 may include circuitry configured to wirelessly receive messages and/or signals. In particular embodiments, receiving module 1030 may communicate received messages and/or signals to determining module 1010 or any other suitable module.

Determining module 1010, communication module 1020, and receiving module 1030 may include any suitable configuration of hardware and/or software. Network node 100 may include additional modules beyond those shown in FIG. 10 that may be responsible for providing any suitable functionality, including any of the functionality described above and/or any additional functionality (including any functionality necessary to support the various embodiments described herein).

Modifications, additions, or omissions may be made to the systems and methods described herein without departing from the scope of the disclosure. The methods may include more, fewer, or other steps. Additionally, steps may be performed in any suitable order. Any of the embodiments described in this document may be combined in any way with each other. Furthermore, even though the examples herein are given in the LAA context, the embodiments described herein are not limited to LAA. The described embodiments are not limited to LTE either, but can be adapted in other RATs too, including but not limited to UTRA, LTE-Advanced, 5G, NX, NB-IoT, WiFi, BlueTooth, etc.

Some embodiments use the generic terminology Primary Serving Cell (PCell), Primary Secondary Cell (PSCell) and Secondary (Serving) Cell (SCell). These terms may refer to different types of serving cells which a certain UE is configured to use. Other non-limiting terms which may be used for these terms are Primary Component Carrier (PCC), Primary Secondary Component Carrier (PSCC), Secondary Component Carrier (SCC), respectively. The term "radio node" used herein may be used to denote a UE or a radio network node.

Embodiments of the present disclosure are applicable to single carrier as well as to multicarrier or carrier aggregation (CA) operation of wireless device 110 in which wireless device 110 is able to receive and/or transmit data to more than one serving cells. The term carrier aggregation (CA) may also be interchangeably referred to as "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining carriers may be referred to as secondary component carrier (SCC) or simply secondary carriers or even supplementary carriers. The serving cell is interchangeably referred to as a primary cell (PCell) or primary serving cell (PSC). Similarly the secondary serving cell is interchangeably referred to as secondary cell (SCell) or secondary serving cell (SSC).

The term "signalling" used herein may comprise any of: high-layer signalling (e.g., via RRC), lower-layer signalling (e.g., via a physical control channel or a broadcast channel), or a combination thereof. The signalling may be implicit or explicit. The signalling may further be unicast, multicast or broadcast. The signalling may also be directly to another node or via a third node.

The term time resource used herein may correspond to any type of physical resource or radio resource expressed in terms of length of time. Examples of time resources are: symbol, time slot, subframe, radio frame, TTI, interleaving time etc.

A shared cell deployment may refer to a deployment with at least one shared cell. For example, the number of RRHs in at least one cell may be two or more. The embodiments described herein may also include a mix scenario, where at least one cell has multiple RRHs and at least one cell has a single transmission point (for example, no RRHs but just normal BS or a single RRH). A mix scenario may be viewed as a cell with 1 TP or 1 RRH. A BS may also transmit signals in a shared cell, in addition to RRHs, and it may be considered as yet another TP in the cell or a may be explicitly indicated that the BS is also transmitting.

Some of the embodiments contemplated herein will now be described more fully hereinafter with reference to the accompanying drawings. Other embodiments, however, are contained within the scope of this disclosure and the invention should not be construed as limited to only the embodiments set forth herein; rather, these embodiments are provided by way of example to convey the scope of the inventive concept to those skilled in the art. Like numbers refer to like elements throughout the description.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
CA Carrier Aggregation
CC Component Carrier
CoMP Coordinated Multi-Point
CRS Cell Specific Reference Signals
DAS Distributed Antenna System
DL Downlink
E-SMLC Evolved Serving Mobile Location Center
GMLC Gateway Mobile Location Center
HBS Home Base Station
HPN High Power Node
LPPa LTE Positioning Protocol Annex
LPN Low Power Node
LPP LTE Positioning Protocol
MME Mobility Management Entity
OTDOA Observed Time Difference of Arrival
PBCH Physical Broadcast Channel
PCI Physical Cell ID
PDSCH Physical Downlink Shared Channel
PRS Positioning Reference Signal
PSS Primary Synchronization Signals
RAN Radio Access Network
RSTD Reference Signal Time Difference
SSS Secondary Synchronization Signals
TP Transmission Point
SIBs System Information Blocks
SFN Single-Frequency Networks

The invention claimed is:

1. A method in a wireless device for reference transmission point (TP) selection, the method comprising:
receiving assistance information from a first node, the assistance information comprising data associated with a first reference TP, the first reference TP located in a cell having two or more TPs;
calculating a first reference signal time difference (RSTD) measurement using the data associated with the first reference TP; and
utilizing the first RSTD measurement in an operational task of the wireless device, wherein the operational task of the wireless device comprises determining a position of the wireless device, controlling the wireless device transmit timing or timing advance, radio resource management (RRM), storing the RSTD measurement in one or more internal or external databases, and utilizing the RSTD measurement for a self-organizing network (SON) solution.

2. The method of claim 1, further comprising communicating the first RSTD measurement to a second node.

3. The method of claim 2, wherein the first node and the second node are the same node.

4. The method of claim 1, wherein the data associated with the first reference TP comprises a TP specific identification.

5. The method of claim 1, wherein the data associated with the first reference TP comprises a TP specific muting pattern.

6. The method of claim 1, further comprising communicating, to a second node, a capability of the wireless device to support RSTD measurements in a cell having two or more TPs.

7. The method of claim 6, wherein the first node and the second node are the same node.

8. The method of claim 1, wherein the data associated with the first reference TP comprises a reference cell associated with the first reference TP.

9. The method of claim 1, further comprising:
determining that the first reference TP does not provide an acceptable RSTD measurement;
selecting a second reference TP different from the first reference TP; and
calculating a second RSTD measurement from the second reference TP.

10. The method of claim 9, further comprising communicating the second RSTD measurement to a second node.

11. The method of claim 10, wherein the first node and the second node are the same node and the first reference TP and the second reference TP are the same reference TP.

12. The method of claim 9, further comprising communicating, to the second node, a reference cell associated with the second reference TP.

13. The method of claim 1, further comprising:
communicating a second reference TP, different from the first reference TP, to at least one of the first node or a second node.

14. The method of claim 1, wherein the first node is one selected from the group comprising: a positioning node, an eNodeB, a radio base station, and a UE.

15. A method in a network node for reference transmission point (TP) selection, the method comprising:
determining a first reference TP for a wireless device to use to calculate a first reference signal time difference (RSTD) measurement, the first reference TP located in a cell having two or more TPs; and
communicating assistance information to the wireless device, the assistance information comprising data associated with the first reference TP,
wherein the first reference TP is determined based on the cell with smallest number of TPs or with number of TPs below a threshold.

16. The method of claim 15, further comprising:
receiving, from the wireless device, a capability of the wireless device to support RSTD measurements in a cell having two or more TPs.

17. The method of claim 15, further comprising:
receiving, from a first node, data associated with the first reference TP.

18. The method of claim 17, wherein the first node is one selected from the group comprising an eNodeB, a positioning node, a radio network node, and a wireless device.

19. The method of claim 15, wherein the data associated with the first reference TP comprises a TP specific identification.

20. The method of claim 15, wherein the data associated with the first reference TP comprises a TP specific muting pattern.

21. The method of claim 15, wherein the data associated with the first reference TP comprises a reference cell associated with the first reference TP.

22. The method of claim 15, further comprising:
receiving, from the wireless device, a first RSTD measurement associated with the data associated with the first reference TP.

23. The method of claim 15, further comprising:
receiving, from the wireless device, an indication of a second reference TP.

24. The method of claim 23, wherein the indication of a second reference TP comprises a reference cell associated with the second reference TP.

25. The method of claim 23, wherein the first reference TP and the second reference TP are the same reference TP.

26. A wireless device, comprising:
- an interface configured to receive assistance information from a first node, the assistance information comprising data associated with a first reference TP, the first reference TP located in a cell having two or more TPs;
- processing circuitry configured to calculate a first reference signal time difference (RSTD) measurement using the data associated with a first reference TP; and
- the processing circuitry is further configured to utilize the first RSTD measurement in an operational task of the wireless device, wherein the operational task of the wireless device comprises determining a position of the wireless device, controlling the wireless device transmit timing or timing advance, radio resource management (RRM), storing the RSTD measurement in one or more internal or external databases, and utilizing the RSTD measurement for a self-organizing network (SON) solution.

27. The wireless device of claim 26, wherein the interface is further configured to communicate the first RSTD measurement to a second node.

28. The wireless device of claim 27, wherein the first node and the second node are the same node.

29. The wireless device of claim 26, wherein the data associated with the first reference TP comprises a TP specific identification.

30. The wireless device of claim 26, wherein the data associated with the first reference TP comprises a TP specific muting pattern.

31. The wireless device of claim 26, wherein the interface is further configured to communicate, to a second node, a capability of the wireless device to support RSTD measurements in a cell having two or more TPs.

32. The wireless device of claim 31, wherein the first node and the second node are the same node.

33. The wireless device of claim 26, wherein the data associated with the first reference TP comprises a reference cell associated with the first reference TP.

34. The wireless device of claim 26, wherein the processing circuitry is further configured to:
- determine that the first reference TP does not provide an acceptable RSTD measurement;
- select a second reference TP different from the first reference TP; and
- calculate a second RSTD measurement from the second reference TP.

35. The wireless device of claim 34, wherein the interface is further configured to communicate the second RSTD measurement to a second node.

36. The wireless device of claim 35, wherein the first node and the second node are the same node and the first reference TP and the second reference TP are the same reference TP.

37. The wireless device of claim 26, wherein the interface is further configured to communicate a reference cell associated with the second reference TP.

38. The wireless device of claim 26, wherein the interface is further configured to communicate a second reference TP, different from the first reference TP, to at least one of the first node or a second node.

39. The wireless device of claim 26, wherein the first node is one selected from the group comprising: a positioning node, an eNodeB, a radio base station, and a UE.

40. A network node, comprising:
- processing circuitry configured to determine a first reference TP for a wireless device to use to calculate a first reference signal time difference (RSTD) measurement, the first reference TP located in a cell having two or more TPs; and
- an interface configured to communicate assistance information to the wireless device, the assistance information comprising data associated with the first reference TP,
- wherein the first reference TP is determined based on the cell with smallest number of TPs or with number of TPs below a threshold.

41. The network node of claim 40, wherein the interface is further configured to receive, from the wireless device, a capability of the wireless device to support RSTD measurements in a cell having two or more TPs.

42. The network node of claim 40, wherein the interface is further configured to receive, from a first node, data associated with the first reference TP.

43. The network node of claim 42, wherein the first node is one selected from the group comprising: an eNodeB, a positioning node, a radio network node, and a wireless device.

44. The network node of claim 40, wherein the data associated with the first reference TP comprises a TP specific identification.

45. The network node of claim 40, wherein the data associated with the first reference TP comprises a TP specific muting pattern.

46. The network node of claim 40, wherein the data associated with the first reference TP comprises a reference cell associated with the first reference TP.

47. The network node of claim 40, wherein the interface is further configured to receive, from the wireless device, a first RSTD measurement associated with the data associated with the first reference TP.

48. The network node of claim 40, wherein the interface is further configured to receive, from the wireless device, an indication of a second reference TP.

49. The network node of claim 48, wherein the indication of a second reference TP comprises a reference cell associated with the second reference TP.

50. The network node of claim 48, wherein the first reference TP and the second reference TP are the same reference TP.

* * * * *